United States Patent
Liu et al.

(10) Patent No.: US 10,380,448 B2
(45) Date of Patent: Aug. 13, 2019

(54) MULTILINE SCANNER AND ELECTRONIC ROLLING SHUTTER AREA IMAGER BASED TUNNEL SCANNER

(71) Applicant: DATALOGIC ADC, INC., Eugene, OR (US)

(72) Inventors: Xinping Liu, Doylestown, PA (US); Andrew Hatstat, Lansdale, PA (US); Federico Canini, Zola Predosa (IT); Pietro Todescato, Eugene, OR (US); Wenliang Gao, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 11 days.

(21) Appl. No.: 15/539,471

(22) PCT Filed: Sep. 30, 2015

(86) PCT No.: PCT/US2015/053287
§ 371 (c)(1),
(2) Date: Jun. 30, 2017

(87) PCT Pub. No.: WO2016/105615
PCT Pub. Date: Jun. 30, 2016

(65) Prior Publication Data
US 2017/0372157 A1 Dec. 28, 2017

Related U.S. Application Data

(63) Continuation-in-part of application No. PCT/IB2014/002932, filed on Dec. 24, 2014.

(51) Int. Cl.
*G06K 9/00* (2006.01)
*G06K 9/20* (2006.01)
(Continued)

(52) U.S. Cl.
CPC ......... *G06K 9/209* (2013.01); *G06K 7/10722* (2013.01); *G06T 1/0007* (2013.01);
(Continued)

(58) Field of Classification Search
CPC ........... G06K 7/10861; G06K 7/10801; G06K 7/10831; G06K 2207/1013;
(Continued)

(56) References Cited

U.S. PATENT DOCUMENTS 5,616,909 A 4/1997 Arackellian
5,627,366 A 5/1997 Katz
(Continued)

FOREIGN PATENT DOCUMENTS

EP 0360581 A2 3/1990
WO 2005008781 A1 1/2005
WO 2014160142 A1 10/2014

OTHER PUBLICATIONS

Georgiev et al., The Multi-Focus Plenoptic Camera, 11 pages. http://www.tgeorgiev.net/Multi_Focus.pdf.
(Continued)

*Primary Examiner* — Li Liu
(74) *Attorney, Agent, or Firm* — Shook, Hardy & Bacon LLP

(57) ABSTRACT

Scanners, methods, and computer storage media having computer-executable instructions embodied thereon that process variable sized objects with high package pitch on a moving conveyor belt are provided. The scanners include a substrate and a plurality of sensors attached to the substrate. The plurality of sensors forms an array of sensors having at least two or more rows of off-axis sensors. The sensors may include a one or more area array sensors. The arrays of sensors captures moving objects row by row and are optimized reduce object spacing on the conveyor belt. Addi-
(Continued)

tionally, the scanner having the array of sensor may process different objects having different heights at the same time. Accordingly, object throughput on the conveyor belt is increased by reducing minimum object gap (e.g., processing of "no gap" or non-singulated objects).

19 Claims, 19 Drawing Sheets

(51) Int. Cl.
*G06T 1/00* (2006.01)
*G06K 7/10* (2006.01)
*H04N 1/028* (2006.01)
*H04N 1/03* (2006.01)
*B65G 15/30* (2006.01)

(52) U.S. Cl.
CPC ........... *H04N 1/02865* (2013.01); *H04N 1/03* (2013.01); *B65G 15/30* (2013.01); *G06K 2209/19* (2013.01)

(58) Field of Classification Search
CPC .. G06K 7/10603; G06K 9/209; G02B 26/105; G02B 26/12; G03B 17/565; H04N 1/02865; H04N 1/03; G06T 1/0007
See application file for complete search history.

(56) References Cited

U.S. PATENT DOCUMENTS

| | | | |
|---|---|---|---|
| 5,633,487 A | 5/1997 | Schmutz et al. | |
| 5,814,802 A | 9/1998 | Hecht et al. | |
| 6,073,851 A | 6/2000 | Olmstead et al. | |
| 6,603,563 B1 | 8/2003 | Gagliano | |
| 6,909,080 B2 | 6/2005 | Patel et al. | |
| 6,963,074 B2 | 11/2005 | McQueen | |
| 6,964,074 B2 | 11/2005 | McQueen | |
| 7,019,822 B1* | 3/2006 | Doak ..................... | B07C 5/342 356/73 |
| 7,568,628 B2 | 8/2009 | Wang et al. | |
| 7,623,226 B2 | 11/2009 | Legoupil | |
| 7,812,869 B2 | 10/2010 | Boettiger | |
| 8,110,790 B2 | 2/2012 | Wurz et al. | |
| 8,286,877 B2 | 10/2012 | Olmstead | |
| 8,353,457 B2 | 1/2013 | Olmstead | |
| 8,699,139 B2 | 4/2014 | Takamoto et al. | |
| 8,967,474 B2 | 3/2015 | Olmstead et al. | |
| 2003/0019930 A1 | 1/2003 | Hecht | |
| 2003/0234289 A1 | 12/2003 | Uhl et al. | |
| 2007/0164202 A1 | 7/2007 | Wurz et al. | |
| 2008/0128508 A1* | 6/2008 | Tsikos ................ | G06K 7/10732 235/462.42 |
| 2010/0013934 A1* | 1/2010 | Saporetti ............ | G06K 7/10732 348/159 |
| 2010/0315541 A1 | 12/2010 | Egawa | |
| 2011/0279672 A1 | 11/2011 | Chaleff et al. | |
| 2012/0013906 A1 | 1/2012 | Govyadninov et al. | |
| 2012/0062996 A1 | 3/2012 | Kim et al. | |
| 2013/0038719 A1* | 2/2013 | Canini ............... | G06K 7/10732 348/135 |
| 2013/0201563 A1* | 8/2013 | Nunnink ................ | G02B 27/14 359/618 |
| 2013/0242086 A1 | 9/2013 | Brueckner et al. | |
| 2013/0308020 A1 | 11/2013 | Ruhnau et al. | |
| 2014/0319219 A1* | 10/2014 | Liu ..................... | G06K 7/10831 235/455 |
| 2014/0362256 A1 | 12/2014 | Schulze et al. | |
| 2015/0268480 A1* | 9/2015 | Schneider .......... | G02B 13/0045 348/208.11 |
| 2015/0347799 A1* | 12/2015 | Gao ................... | G06K 7/10831 235/454 |

OTHER PUBLICATIONS

Datalogic AV6010 System Manual, 246 pages. http://www.datalogic.com/tools/download.aspx?iddwnfile=9246&path=%2fupload%2fia%2fmanuals%2fAV6010+System+Manual.pdf&name=AV6010+System+Manual.

Datalogic NVS9000 Series System Reference Manual, Sep. 7, 2012, 157 pages. http://www.datalogic.com/tools/download.aspx?iddwnfile=12246&path=%2fupload%2fia%2fmanuals%2fNVS9000+System+Manual.zip&name=NVS9000+System+Manual.

https://www.lytro.com, accessed Jan. 8, 2015, 3 pages.

Metrologic Group, accessed Dec. 19, 2014, 1 page. http://www.metrologic.fr/.

Cognex Machine Vision and Industrial Barcode Readers, accessed Dec. 19, 2014, 1 page. http://www.cognexcom/Cognex_General_PPC_LP_2014.aspx?cm_campid=244CA8FE-441F-E411-94A3-5EF3FCDAF1B7&gclid=ClaR0PCI08ICFccRMwodWQoAcw&pageid=14605&langtype=1033.

Sick Group, accessed Dec. 19, 2014, 2 pages. http://www.sick.com/group/EN/home/Pages/Homepage1.aspx.

Datalogic NVS9000, Automatic Fine Tuning Application Note, First Release Nov. 18, 2010, 15 pages.

Datalogic DS2 Series, Object detection and measurement light grid, Instruction Manual, Copyright Datalogic 2007-2010, 47 pages.

Datalogic NVS9000 Series Installation and Startup Manual, Sep. 7, 2012, 82 pages.

Datalogic NVS9000 V5 Software Release, Features and Installation Notes, 1 page.

Datalogic S80-MH-5-Y09 Instruction Manual, Copyright Datalogic 2008-2009, 6 pages.

Datalogic WebSentinel User's Manual, 128 pages www.automation.datalogic.com.

Aptina MT9P031: 1/2.5-Inch 5 Mp CMOS Digital Image Sensor Datasheet, Copyright 2015, Semiconductor Components Industries, LLC, 46 pages. Last accessed Oct. 15, 2015 http://www.onsemi.com/pub_link/Collateral/MT9P031-D.PDF.

Altasens AL30205M-85 High-Temperature Sensor Specifications, Copyright 2014 AltaSens, 1 page. Last accessed Oct. 15, 2015 http://www.altasens.com/index.php/products-49491/720-1080p/al30205m-86.

Altasens A45904T Sensor Specifications, Copyright 2014 AltaSens, 1 page. Last accessed Oct. 15, 2015 http://www.altasens.com/index.php/products-49491/720-1080p/a4590-4t.

International Search Report and Written Opinion dated Sep. 23, 2015 in International Patent Application No. PCT/IB2014/002932, 11 pages.

International Search Report and Written Opinion dated Feb. 4, 2016 in International Patent Application No. PCT/US2015/53287, 11 pages.

International Preliminary Report on Patentability dated Jul. 6, 2017 in International Patent Application No. PCT/IB2014/002932, 8 pages.

International Preliminary Report on Patentability dated Jul. 6, 2017 in International Patent Application No. PCT/US2015/53287, 8 pages.

* cited by examiner

US 10,380,448 B2

MULTILINE SCANNER AND ELECTRONIC ROLLING SHUTTER AREA IMAGER BASED TUNNEL SCANNER

PRIORITY

This application is a continuation of PCT/IB2014/002932, entitled Multiline Scanner, filed 24 Dec. 2014, which is hereby incorporated by reference in its entirety.

BACKGROUND OF THE INVENTION

Conventional scanners process packages by reading and decoding information affixed to the packages as they move along a conveyor system. Typically, the scanners incorporate a light source and a light detecting means, such as charge-coupled device (CCD) sensors or complementary metal-oxide-semiconductor (CMOS) sensors. A portion of the light which is reflected from the package is detected by the image sensor and converted into an electrical signal, which is the basis for the object properties that include digital images of a package that has been read by the scanner. The digital image is processed and decoded according to instructions executed by one or more computer processors of the conventional scanners or the conveyor system.

The conventional scanners are manufactured with a high speed imager having a fixed focal length lens and a moving mechanical focus mechanism. The focus mechanism is positioned based on the dimension information of the package received from a rangefinder upstream from the scanner. The moving focus mechanism of the scanner is relatively slow, expensive, and can be a potential reliability problem. In instances when the scanner is unable to capture a useable image of the package, the packages are scanned manually by a package handler with a conventional scanner. The manual processing of the packages reduces the efficiency for package processing in the conveyor system.

Because of the limited depth of field associated with the fixed lens system, conventional scanners rely on the mechanical focusing mechanism to improve image quality. Normally, the depth of field is not large enough to produce sharp images for different types of package that vary in size (e.g., tall packages: boxes, and short packages: letters) on the same conveyor belt. Accordingly, pre-sorting by the package handlers may be employed during package processing. For instance, pre-sorting may require specific placement of packages based on package size or type. Alternatively, pre-sorting may require singulated flow of packages before packages are scanned.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention relate to processing objects on a conveyor belt with a multiline scanner. A computer system is configured to control the multiline scanner having a sensor array or area array sensor. The computer system activates one or more rows of the sensor array as the objects are transported within a field of view of the sensor array by the conveyor belt system. In one embodiment, the sensor array has a shared lens system. One or more rows of the sensor array are activated as the objects are transported by the conveyor belt system within a field of view of the sensor array. In turn, the computer system switches among several rows of the sensor array to determine properties for the objects on the conveyor belt. The computer system, in turn, generates images from the object properties obtained from the sensor array.

In another embodiment, a scanner device is provided. The scanner device includes a substrate and a plurality of sensors. The plurality of sensors is attached to the substrate. In certain embodiments, the plurality of sensors forms an array of sensors having at least two or more rows of off-axis sensors. The sensors may include charge-coupled device (CCD) sensors or complementary metal-oxide-semiconductor (CMOS) sensors.

BRIEF DESCRIPTION OF THE DRAWING

Embodiments of the invention are illustrated by way of example and not limitation in the accompanying figures in which like reference numerals indicate similar elements and in which.

DETAILED DESCRIPTION OF THE INVENTION

Figure 1:
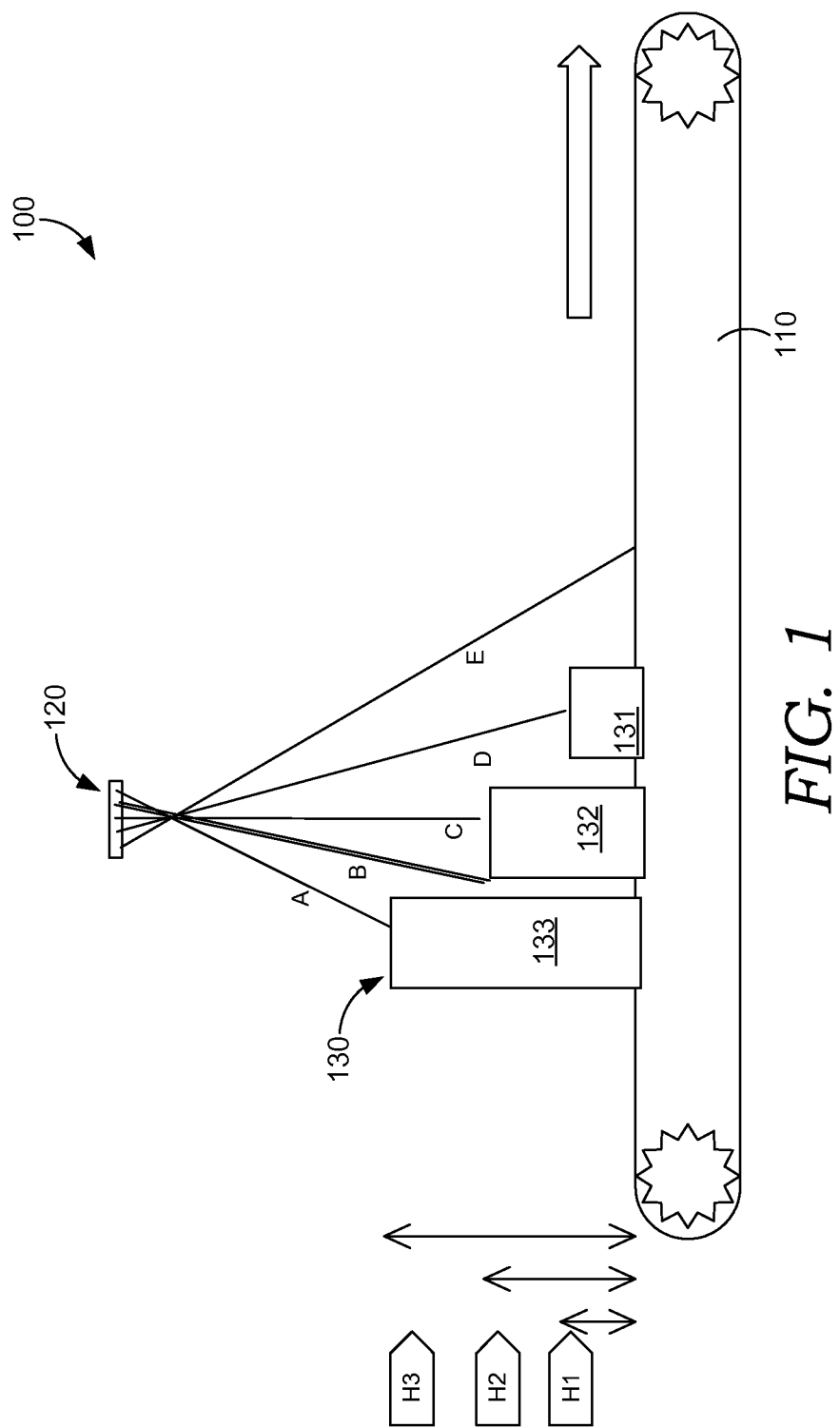
FIG. 1 is a schematic diagram of an exemplary conveyor system for object processing in accordance with embodiments of the invention.

The subject matter of the embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention eliminate the need for moving focus mechanisms in scanner devices that obtain images of objects on a conveyor belt. In one embodiment, the scanner devices include an optical element connected to a sensor array that processes light reflected by the objects on the conveyor belt. The scanner device may include several types of sensors (e.g., area array sensors, linear sensor array, line scan sensors). For instance, the scanner device may include an area array sensor with several rows and a random programmable region of interest readout configuration. The scanner device may include rows of linear sensor arrays. Alternatively, the scanner device may include rows of line scan sensors.

The sensor array processes the light refracted at the optical element. The refracted light is received at different rows in the sensor array. In one embodiment, the light at each row may be processed by a computer processor in a different manner to determine the appropriate object properties.

To reduce the size of the scanner, the sensor array may be fabricated on a single die package with multiple rows that are close together. The small spacing between rows provides for small imaging areas and reduces overall package size for the single die package. In some embodiments, the single die package consists of a substrate and a plurality of packaged sensors on the substrate, each sensor comprising at least one linear array of sensing elements, wherein the linear array is positioned off-axis with respect to a centerline of the single die package extending along a major dimension of the single die package.

In other words, the sensor array may consist of two CCD or CMOS sensors with an off-center sensing line. The sensors may be placed with opposite orientations such that the sensing lines are spatially very close. The sensors face the same receiving lens. The sensors are placed on the same substrate; however, they have different distances from the imaging lens, creating a difference in the respective focal point and therefore correctly imaging different parts of the scanner's field of view.

Throughout this patent, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:

CCD Charge-Coupled Device
CD-ROM Compact Disc Read-only Memory
CMOS Complementary Metal-Oxide-Semiconductor
CPU Central Processing Unit
DVD Digital Versatile Disc
EE-PROM Electronically Erasable Programmable Read-only Memory
E-ISBN Electronic International Standard Book Number
ERS Electronic Rolling Shutter
FPS Frames Per Second
ISBN International Standard Book Number
LED Light Emitting Diode
NFC Near Field Communication
NSRL National Software Reference Library
PDA Personal Data Assistant
RAM Random Access Memory
RFID Radio Frequency Identification
ROM Read-only Memory
SSCC Serial Shipping Container Code
UPC Universal Product Code
WiFi Wireless Fidelity Further, various technical terms are used throughout this description. An illustrative resource that fleshes out various aspects of these terms can be found in Newton's Telecom Dictionary, 25th Edition (2009).

Accordingly, embodiments of the invention provide a multiline scanner that has at least one image sensor with multiple sensor rows. The multiline scanner may generate several images for the objects moving on the conveyor belt. The configuration of the sensor array or optical elements may vary according to several embodiments of the invention.

In certain embodiments, the multiline scanner includes a tilted sensor array or optical elements that are positioned in front of the sensors in the sensor array. The tilted sensor array or the optical element in the multiline scanner may impact a path of light reflected by the object. In one embodiment, the optical path length between the imaging lens and the sensor array may be different for each row of the sensor array.

Thus, the multiline scanner may be configured to read a barcode or label which is placed (top, front, side, back) on an object moving on the conveyor belt. The size (e.g., width, height, length) of the moving object can vary. The multiline scanner may capture at least one focused image for the moving object via the sensor array.

In some embodiments, the minimum spacing between objects may depend on the specific spacing of the sensors in the sensor array. One approximate formula that relates row spacing and minimum package gap follows:

$$s = \frac{d \times l}{f};$$

where s is the minimum gap in the object space; d is the separation between two sensor rows or two groups of sensor rows in the sensor array; f is the effective focal length of the imaging lens; and l is the object's distance from the imaging lens (l is greater than or equal to f). Preferably, in one embodiment, l is greater than or equal to 20f.

A conveyor system includes a belt that transports objects. The objects are read by a scanner. In most embodiments, the scanner is positioned over the belt and captures images of the objects as the objects enter a field of view for the scanner. The scanner may be positioned parallel to the conveyor belt. Alternatively, the scanner may be angled toward the conveyor belt. The scanner is configured to capture images of multiple objects at the same time. Accordingly, the conveyor system does not require singulated object flow.

FIG. 1 is a schematic diagram of an exemplary conveyor system 100 for object processing in accordance with embodiments of the invention. The conveyor system 100 includes a conveyor belt 110 and a scanner 120. Objects 130 having different sizes (e.g., length, width, and height) are transported on top of the conveyor belt 110.

The conveyor system 100 obtains object properties as the objects 130 are transported by the conveyor belt 110. For instance, the conveyor system 100 may be transporting three objects 131, 132, and 133. The sizes of the three objects 131, 132, and 133 may vary. As illustrated in FIG. 1, the heights of the objects are as follows: object 131 has a height of H1 (e.g., quarter of a meter), object 132 has a height of H2 (e.g., half of a meter), and object 133 has a height of H3 (e.g., one meter).

The scanner 120 is positioned above the objects 130 and reads the objects 130 with light rays (A, B, C, and D) reflected by the objects 130. The light ray A reads object 133, light rays B and C read object 132, and light ray D reads object 131. In one embodiment, the light rays A-E represent a field of view of one of the sensors rows of the scanner 120.

Accordingly, the scanner 120 may be configured to obtain various object properties from the objects 130. The objects 130 are sequenced such that focus distances for the scanner decrease as the objects 130 are transported by the conveyor belt 110. The scanner 120 may capture object properties for a low height object 131 before object properties for a high height object 133 or 132 are fully acquired. Each adjacent sensor row may have alternating focus distance orientations in some embodiments of the invention. A first sensor row may be configured with a plurality of sensors having increasing focus distances. The row adjacent to the first row may be configured with a plurality of sensors having decreasing focus distances.

In another embodiment, the conveyor system includes a belt that transports objects. The objects are read by a scanner with rows of linear sensor array or area array sensors configured with low to high variance in focus distance.

Figure 2:
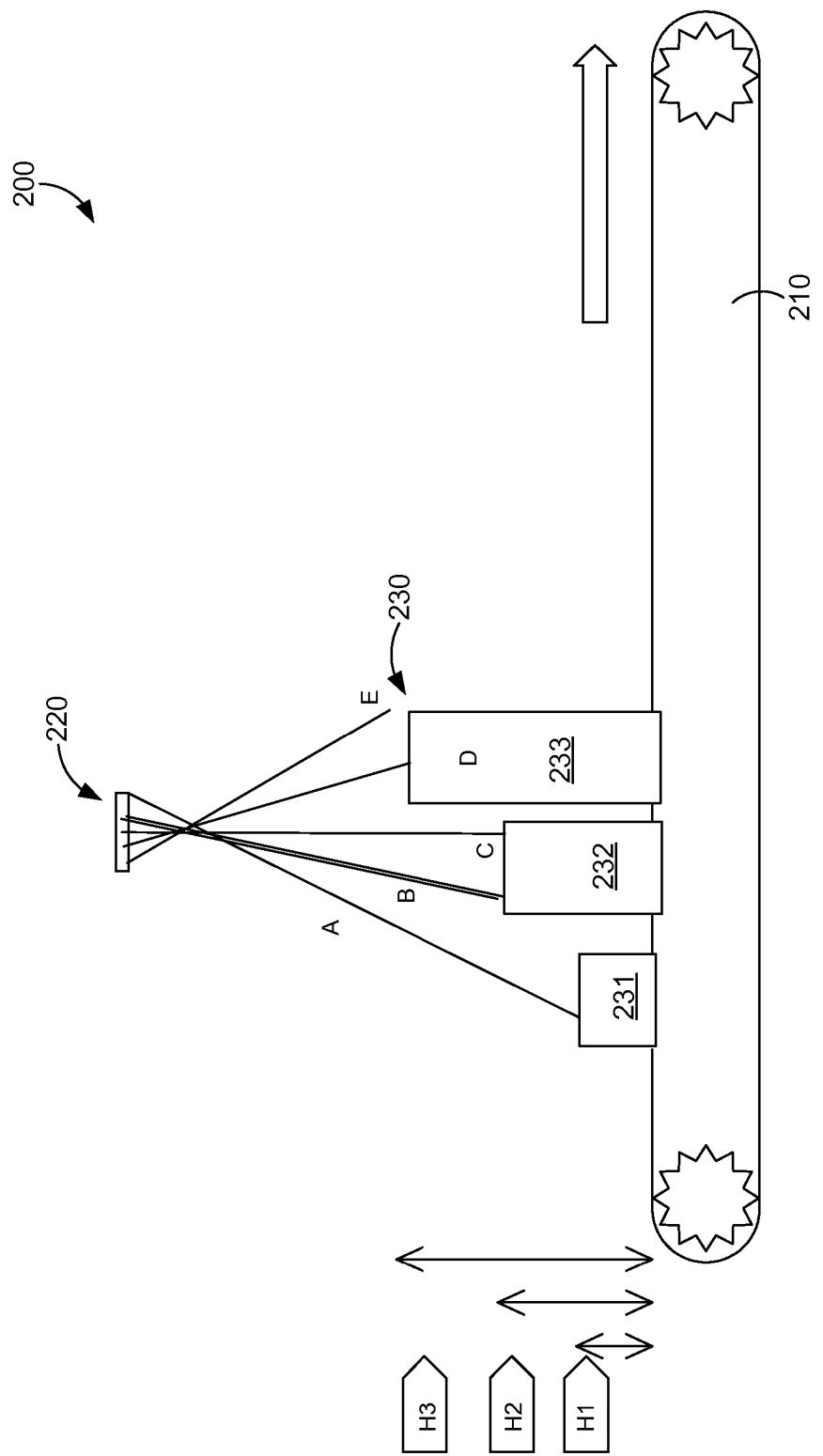
FIG. 2 is another schematic diagram of an exemplary conveyor system for object processing in accordance with embodiments of the invention.

FIG. 2 is another schematic diagram of an exemplary conveyor system 200 for object processing in accordance with embodiments of the invention. The conveyor system 200 includes a conveyor belt 210 and a scanner 220. Objects 230 having different sizes (e.g., length, width, and height) are transported on top of the conveyor belt 210.

The conveyor system 200 obtains object properties as the objects 230 are transported by the conveyor belt 210. For instance, the conveyor system 200 may be transporting three objects 231, 232, and 233. The sizes of the three objects 231, 232, and 233 may vary. As illustrated in FIG. 2, the heights of the objects are as follows: object 231 has a height of H1 (e.g., a quarter of a meter), object 232 has a height of H2 (e.g., half of a meter), and object 233 has a height of H3 (e.g., one meter).

The scanner 220 positioned above the objects 230 reads the objects 230 with light rays (A, B, C, and D) reflected by the objects 230. The light ray A reads object 231, light rays B and C read object 232, and the light ray D reads object 233. In certain embodiments, the light rays A-E represent a field of view of one of the sensors rows of the scanner 220.

Accordingly, the scanner 220 may be configured to obtain various object properties from the objects 230. The objects 230 are sequenced such that focus distances for the sensors in the rows of sensor array in scanner 220 increase as the objects 230 are transported by the conveyor belt 210. The scanner 220 may capture object properties for a high height object 233 before object properties for a low height object 231 or medium height object 232 are fully acquired.

In another embodiment, the conveyor system includes a scanner that is positioned at an angle that is directed toward the conveyor belt. The objects are read by a scanner that may be configured with high to low variance in focus distance. The scanner may read both a top and a side of the objects.

Figure 3:
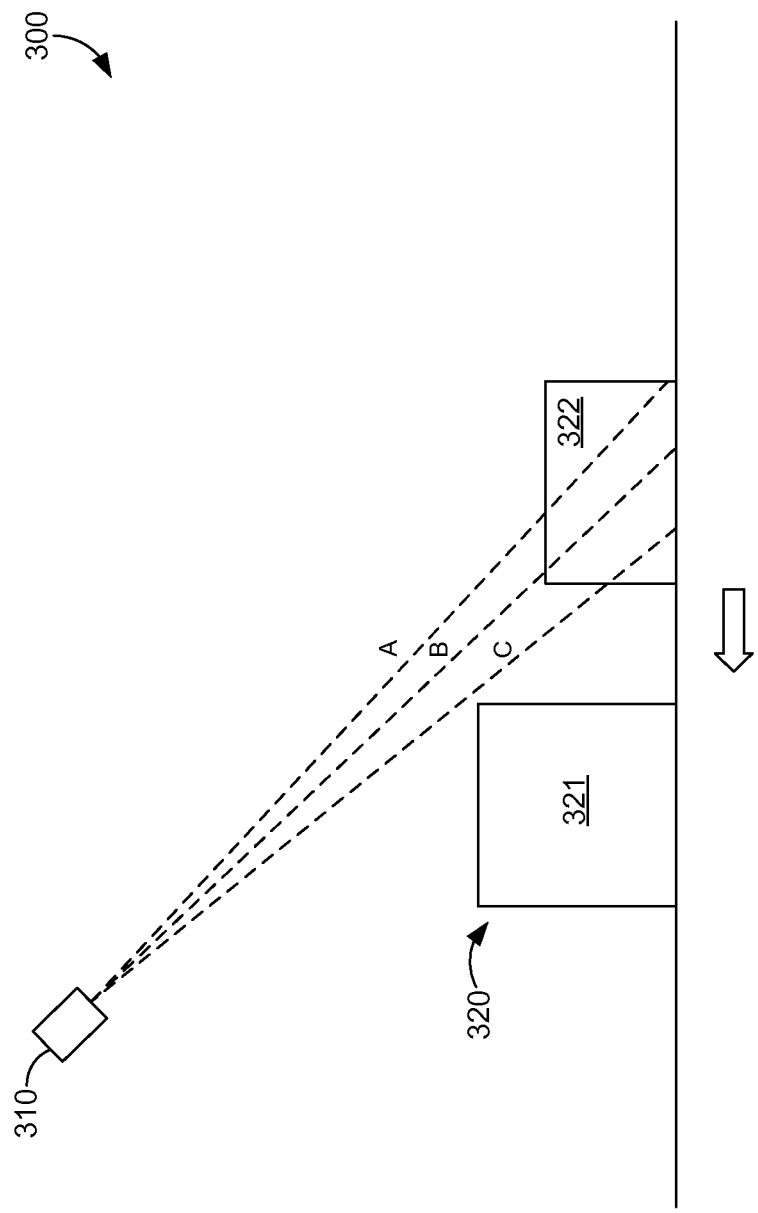
FIG. 3 is another schematic diagram of an exemplary conveyor system for object processing in accordance with embodiments of the invention.

FIG. 3 is another schematic diagram of an exemplary conveyor system 300 for object processing in accordance with embodiments of the invention. The conveyor system 300 includes a conveyor belt and a scanner 310. Objects 320 having different sizes (e.g., length, width, and height) are transported on top of the conveyor belt.

The conveyor system 300 obtains object properties as the objects 320 are transported by the conveyor belt. For instance, the conveyor system 300 may be transporting two objects 321 and 322 with varying height sizes. As illustrated in FIG. 3, the heights of the objects are as follows: object 321 is taller than object 322.

The scanner 310 angled above the objects 320 reads the objects 320 with light rays (A, B, and C) reflected by the objects 320. The light rays A, B, and C read object 322. The light rays A and B provide properties for a top side of the object 320. The light ray C provides properties for a side of the object 320. As the object moves toward the scanner 310, each of the light rays A, B, and C capture several object properties that may be combined to create an image of the object 320. In certain embodiments, the light rays A-C represent a field of view of one of the sensors rows of the scanner 310.

Accordingly, the scanner 310 may be configured to obtain various object properties from the objects 320 including top and side images. The objects 320 are sequenced such that focus distances for the scanner 310 decreases as the objects 320 are transported by the conveyor belt. The scanner 310 may capture object properties for a low height object 322 after object properties for a high height object 321 are fully acquired.

In another embodiment, the scanner may have a plurality of sensors that produce a scan direction that is perpendicular to the motion movement of the object on the conveyor belt. The properties captured from the object may be used to generate image pixels for the objects that are processed.

Figure 4:
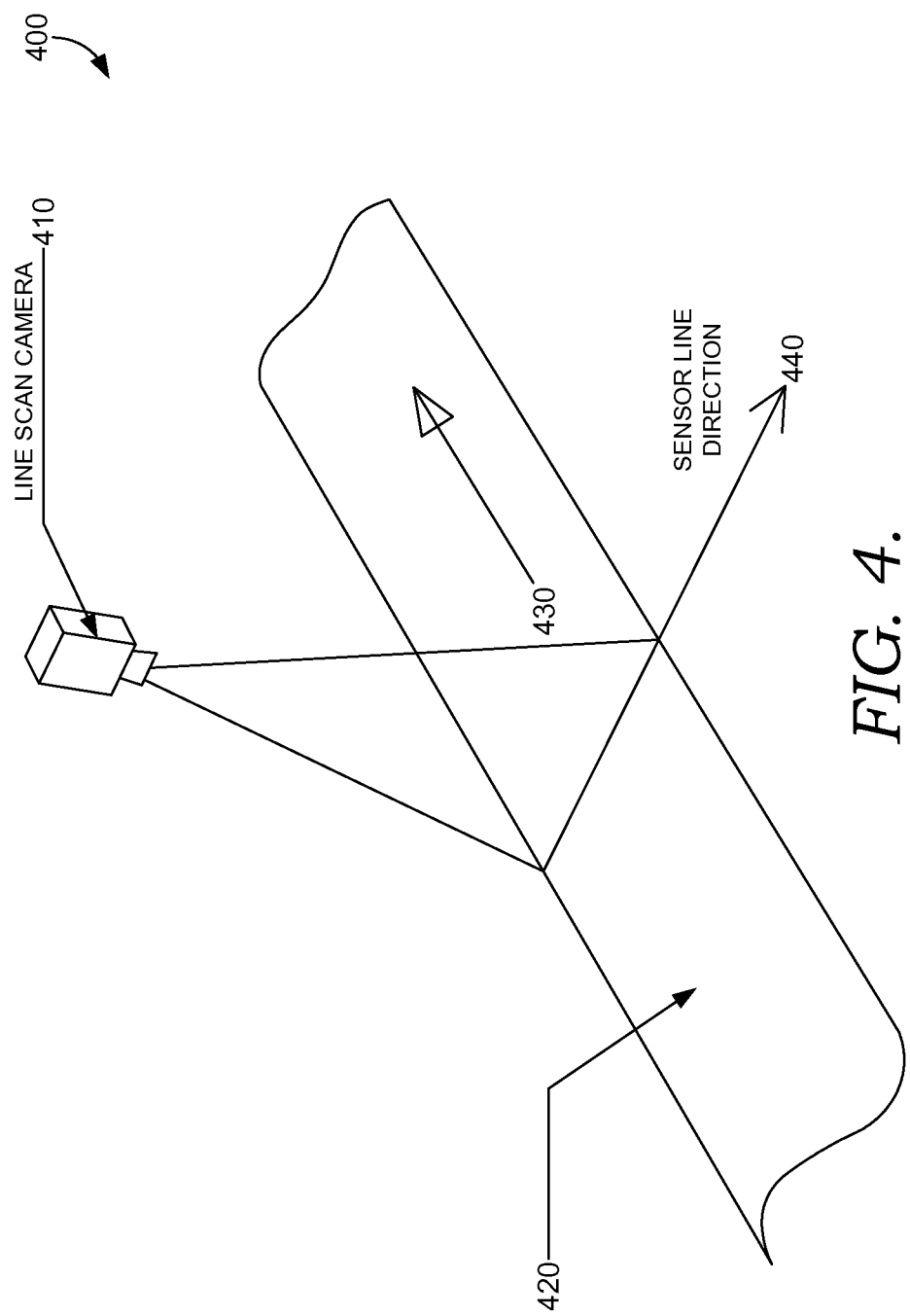
FIG. 4 is another schematic diagram of an exemplary conveyor system illustrating a sensor scanning direction in accordance with embodiments of the invention.

FIG. 4 is another schematic diagram of an exemplary conveyor system 400 illustrating a sensor scanning direction in accordance with embodiments of the invention. The conveyor system includes a scanner 410 and a conveyor belt 420. The scanner 410 may process a series of light rays in sensor scan direction 440, which is perpendicular to object travel direction 430. The light rays are sensed by a series of sensors in the scanner 410.

Accordingly, the scanner 410 processes light obtained along a sensor scan direction 440. The sensor scan direction 440 allows the scanner 410 to obtain object properties from objects that are adjacent on the conveyor system along a dimension parallel to the scan direction. The object properties for adjacent properties may be obtained by the scanner simultaneously. These object properties may be combined to form an image having the two adjacent packages.

In one embodiment, the scanner has several components that process light received from an object. The scanner may include one or more rows of linear sensor arrays that are packaged on a single die. The linear sensor arrays receive light traveling through a lens as the light is reflect by the object moving on the conveyor belt. The linear sensor arrays are included in sensor packages.

In one embodiment, the scanner may include at least two rows of linear sensor arrays. A centerline of each sensor package is used to position two or more linear sensor arrays off-axis. In one embodiment, the centerline runs along a major dimension (e.g., length) of the sensor package. In turn, the linear sensor array (within each of the two or more off-axis sensor packages) is positioned such that the sensing array line is as close to the border of the sensor package. In other words, the linear sensor array is as far as possible from the centerline of the sensor package. This results in a minimum distance between adjacent sensing lines when the packaged sensors are mounted on the substrate (e.g., a single die).

Figure 5:
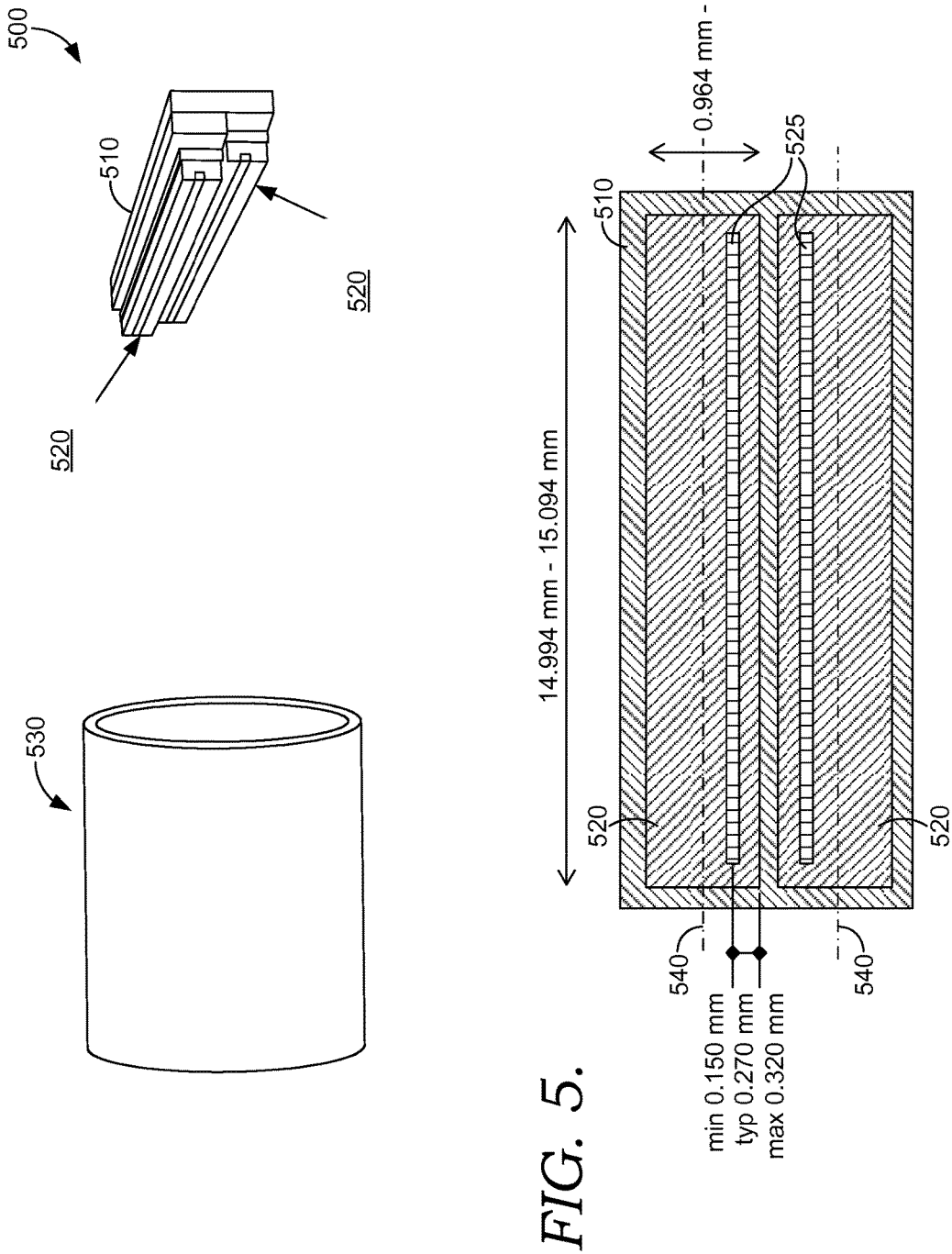
FIG. 5 is a block diagram of components for an exemplary scanner in accordance with embodiments of the invention.

FIG. 5 is a block diagram of components for an exemplary scanner 500 in accordance with embodiments of the invention. The scanner 500 includes a substrate 510 that is manufactured with a plurality of sensing packages 520 that process light obtained from a shared lens 530.

The substrate 510 is sized to be as compact as possible within scanner 500. In one embodiment, the substrate is sized between 14 and 15 millimeters in length and about two millimeters in height. The substrate 510 may be made of ceramic or plastic. The substrate may include two or more sensing packages 520. In one embodiment, the sensing packages 520 include two or more linear sensors 525. In an alternate embodiment, the sensing packages 520 include two or more rows of area array sensors. In certain embodiments, the sensing packages 520 include two or more linear sensors 525 that are adjacent to each other may be stacked on the substrate to create an L-shaped cross-section. In other words, the sensing packages 520 may be positioned on steps formed in the material of the substrate to vary a distance between the lens 530 and the sensing packages 520.

The linear sensor array 525 is fabricated within the sensing package 520. In certain embodiments, adjacent linear sensor arrays 525 may be positioned off-axis. The sensing package 520 may be approximately one millimeter in height and 12 millimeters in length. The sensing package 520 contains the linear sensor array 525. Each sensing package 520 has a centerline 530 that divides the sensing package 520 in half along the horizontal plane of the sensing package 520. In one embodiment, the centerline 530 of the sensing package 520 is used as reference to position the linear sensor arrays 525 off-axis. For instance, the linear sensor arrays 525 may be positioned above or below the centerline 530. In some embodiments, the linear sensor arrays 525 are positioned close to the major border of the sensing packages 520. The distance between the border of the sensing package 520 and the linear sensor arrays 525 may range between 0.150 millimeters as the minimum and 0.320 millimeters as the maximum. The typical distance may be 0.270 millimeters.

Accordingly, the scanner device includes sensor arrays that are positioned off-axis or at variable distances from a shared lens. The scanner with this configuration may be able to obtain object properties from several objects at the same time with small object spacing between each object.

FIGS. 6-13 provide alternative configurations for optical components of the scanner. These configurations may be used to efficiently detect object properties that include size, images, label text, pixel, etc. Each of the configurations includes a sensor array that is positioned to process an image of the object.

In one embodiment, the sensor array has multiple rows. It is a detector that captures object properties, including several images for the objects on the conveyor belt. By tilting the sensor arrays or adding special optical elements in front of the sensor array, the optical path length between the imaging lens and the sensor array may be varied for each of the rows of the sensor. A scanner with the appropriate configuration reads a barcode (e.g., E-ISBN, ISBN, RFID, SSCC, or UPC) that is placed on moving objects that have different dimensions (e.g., the height of the moving objects can vary). The scanner will obtain at least one row of in-focus images for each of the objects transported by the conveyor belt.

In certain embodiments, an optical plate may be positioned between the sensor array and the shared lens. The thickness of the optical plate can be different for each of the rows of the sensor array. The thick segment of the optical plate can be used for focusing the far-distance object onto the image plane (e.g., sensor array).

Figure 6:
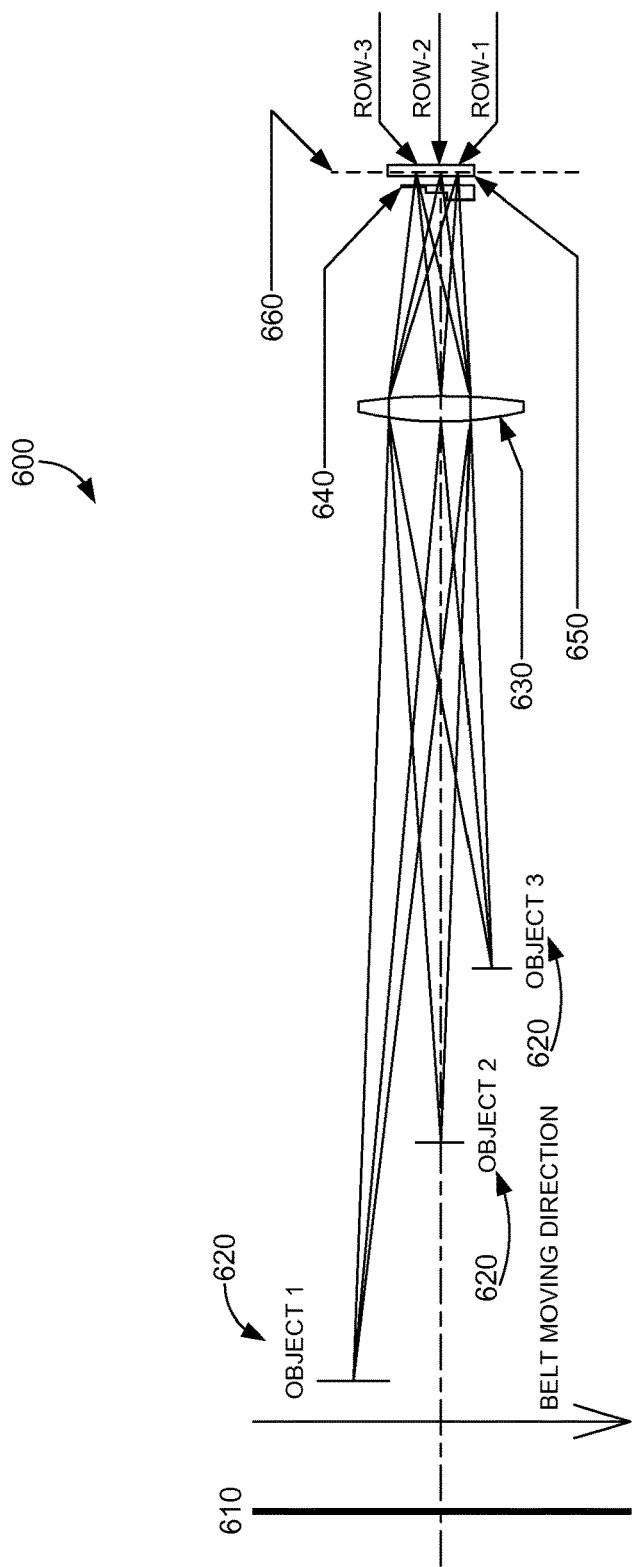
FIG. 6 is an optical diagram for an exemplary scanner with a first configuration in accordance with embodiments of the invention.

FIG. 6 is an optical diagram for an exemplary scanner 600 with a first configuration in accordance with embodiments of the invention. The scanner 600 processes objects 620 that are transported on conveyor belt 610. The scanner 600 includes a lens 630, an optical plate 640, a sensor array 650, and object images 660.

The scanner 600 may obtain object properties from the several objects 620 on the belt 610. In one embodiment, the scanner 600 obtains properties from three objects 620. Each of the objects 620 may be processed by a different row of the sensor array. In some embodiments, each of the rows produces different object properties.

The optical plate 640 may have variable thicknesses. In one embodiment, each row of the sensor array 650 may correspond to a segment of the optical plate 640 with a thickness that is different from another segment of the optical plate associated with adjacent rows in the sensor array 650. The first thickness (e.g. 0.01 millimeters) of the optical plate 640 may be for the closest object 620 to the lens 630. The second thickness (e.g. 0.05 millimeters) of the optical plate 640 is larger than the first thickness. This portion of the optical plate 640 may be for the second closest object 620 to the lens 630. The third thickness (e.g. 0.08 millimeters) of the optical plate 640 is larger than the first and second thicknesses. This portion of the optical plate 640 may be for the third closest object 620 to the lens 630. Accordingly, each row of the sensor array 650 may process different object properties from the captured object images 660.

Figure 7:
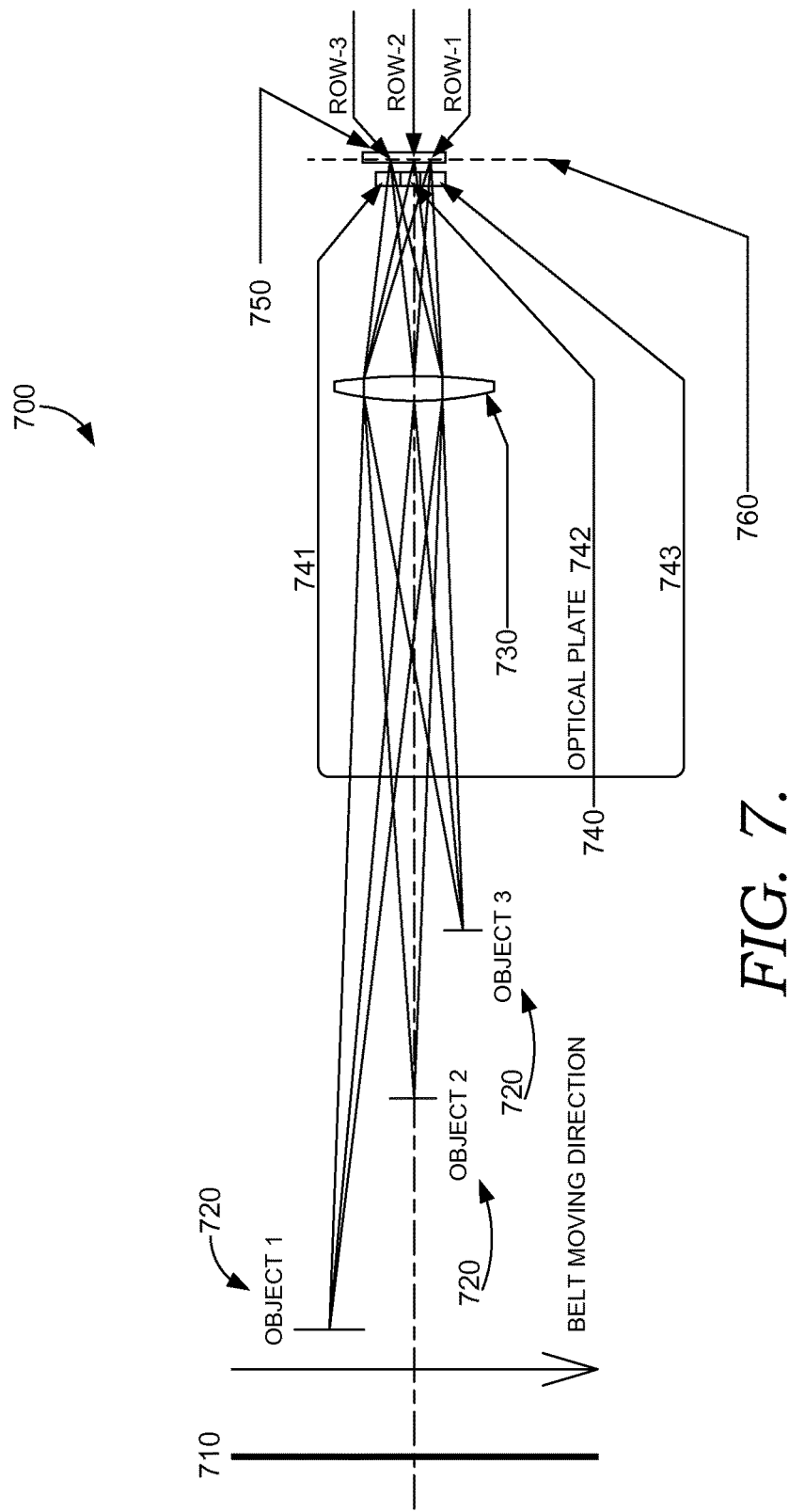
FIG. 7 is an optical diagram for an exemplary scanner with a second configuration in accordance with embodiments of the invention.

FIG. 7 is an optical diagram for an exemplary scanner 700 with a second configuration in accordance with embodiments of the invention. The scanner 700 processes objects 720 that are transported on conveyor belt 710. The scanner 700 includes a lens 730, an optical plate 740, a sensor array 750, and object images 760.

The scanner 700 may obtain object properties from several objects 720 on the belt 710. In one embodiment, the scanner 700 obtains properties from three objects 720. Each of the objects 720 may be processed by a different row of the sensor array 750. In some embodiments, each of the rows produces different object properties.

The optical plate 740 may have uniform thicknesses and variable refractive indices. Alternatively, the optical plate 740 may have both non-uniform thicknesses and variable refractive indices. In one embodiment, each row of the sensor array 750 may correspond to an optical plate 740 with a refractive index that is different from other portions of the optical plate 740 for adjacent rows in the sensor array 750. For instance, the optical plate 740 may have three refractive indices (741-743). The first refractive index 741 (e.g., low refractive index 1.2-1.4) of the optical plate 740 may be for the closest object 720 to the lens 730. The second refractive index 742 (e.g., medium refractive index 1.5-1.6) of the optical plate 740 is larger than the first refractive index. This portion of the optical plate 740 may be for the second closest object 720 to the lens 730. The third refractive index 743 (e.g., high refractive index 1.6-2.0) is larger than the first and second refractive indices. This portion of the optical plate 740 may be for the third closest object 720 to the lens. Each row of the sensor array 750 may process different object properties from the captured object images 760.

Figure 8:
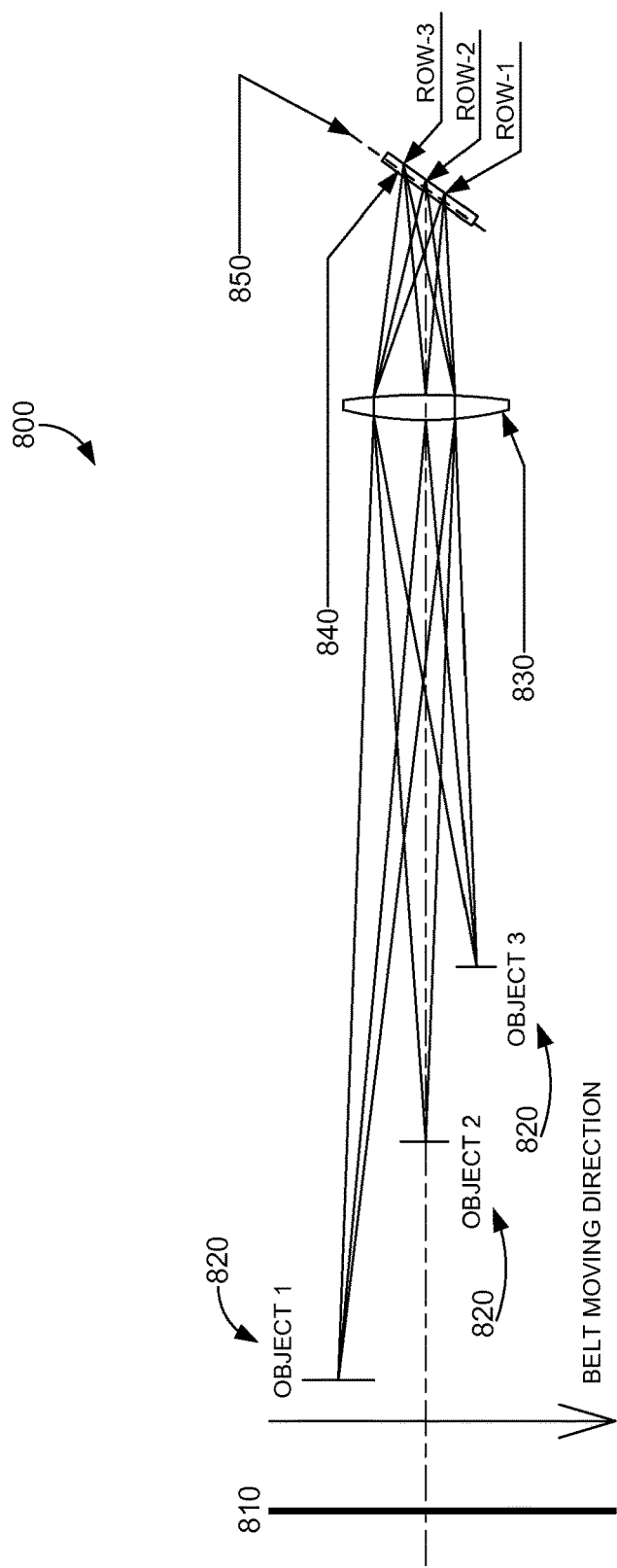
FIG. 8 is an optical diagram for an exemplary scanner with a third configuration in accordance with embodiments of the invention.

FIG. 8 is an optical diagram for an exemplary scanner 800 with a third configuration in accordance with embodiments of the invention. The scanner 800 processes objects 820 that are transported on conveyor belt 810. The scanner 800 includes a lens 830, a sensor array 840, and object images 850.

The scanner 800 may obtain object properties from several objects 820 on the belt 810. In one embodiment, the scanner 800 obtains properties from three objects 820. Each of the objects 820 may be processed by a different row of the sensor array 840. In some embodiments, each of the rows produces different object properties.

An optical plate is omitted in this configuration. In one embodiment, each row of the sensor array 840 may be angled toward, or away from, the shared lens 830.

For instance, the sensor array 840 may have three rows that are angled away from the lens 830. The first row of the sensor array 840 is the closest to the lens 830. The second row of the sensor array 840 is the second closest to the lens 830. The third row of the sensor array 840 is the third closest to the lens 830.

The first row of the sensor array (e.g., Row 1) may be for the furthest object from the lens 830. The first row of the sensor array is the closest to the lens 830. The second row of the sensor array (e.g., Row 2) may be for the second furthest object 820 from the lens 830. The third row of the sensor array (e.g., Row 3) may be for the third furthest object 820 from the lens 830. In some embodiments, each row may have a different angle to the normal of the sensor array 840. Additionally, each row of the sensor array 840 may process different object properties from the captured object images 850.

Figure 9:
FIG. 9 is an optical diagram for an exemplary scanner with a fourth configuration in accordance with embodiments of the invention.

FIG. 9 is an optical diagram for an exemplary scanner 900 with a fourth configuration in accordance with embodiments of the invention. The scanner 900 processes objects 920 that are transported on conveyor belt 910. The scanner 900 includes a lens 930, an optical plate 940, a sensor array 950, and object images 960.

The scanner 900 may obtain object properties from several objects 920 on the belt 910. In one embodiment, the scanner 900 obtains properties from three objects 920. Each of the objects 920 may be processed by a different row of the sensor array 950. In some embodiments, each of the rows produces different object properties.

The optical plate 940 may have one or more lenses. Each lens may have a different focal length. In one embodiment, each row of the sensor array may correspond to an optical plate 940 with a focal length that is different from other portions of the optical plate 940 for adjacent rows in the sensor array 950. For instance, the optical plate 940 may have three lenses (941-943). The first lens 941 (e.g., small focal length 20 mm) may be for the closest object 920 to the lens 930. The second lens 942 (e.g., medium focal length 40 mm) is has a focal length that is larger than the first focal length. This portion of the optical plate 940 may be for the second closest object 920 to the lens 930. The third lens (e.g., high focal length 80 mm) has a focal length that is larger than the first and second focal lengths. This portion of the optical plate 940 may be for the third closest object 920 to the lens 930. Each row of the sensor array 950 may process different object properties from the captured object images 960, in certain embodiments of the invention.

Figure 10:
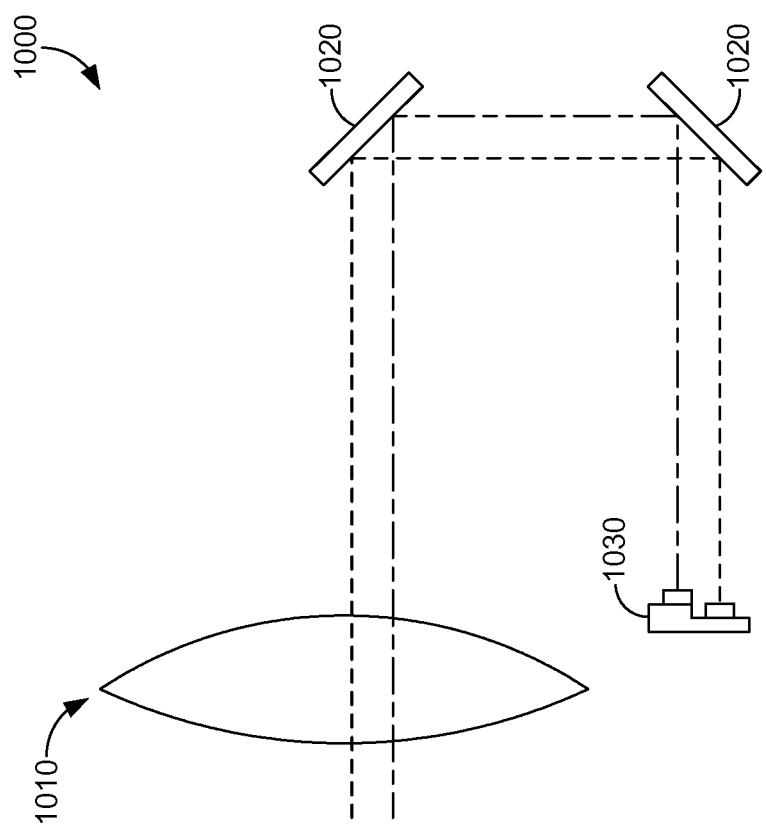
FIG. 10 is an optical diagram for an exemplary scanner with a fifth configuration in accordance with embodiments of the invention.

FIG. 10 is an optical diagram for an exemplary scanner 1000 with a fifth configuration in accordance with embodiments of the invention. The scanner 1000 includes a lens 1010, mirrors 1020, and sensor array 1030. In an effort to reduce the size of the scanner 1000 one or more mirrors 1020 are used to direct the light to the sensor array 1030. The mirrors 1020 reflect the light to the sensor array 1030. The mirrors are positioned at a distance needed to direct the light to the sensor array 1030. In one embodiment, the scanner uses two mirrors to direct the light. The sensor array 1030 may consist of at least two rows of off-axis linear sensors arrays. In certain embodiments, the linear sensor arrays may be positioned at different heights on a substrate of the scanner 1000.

Figure 11:
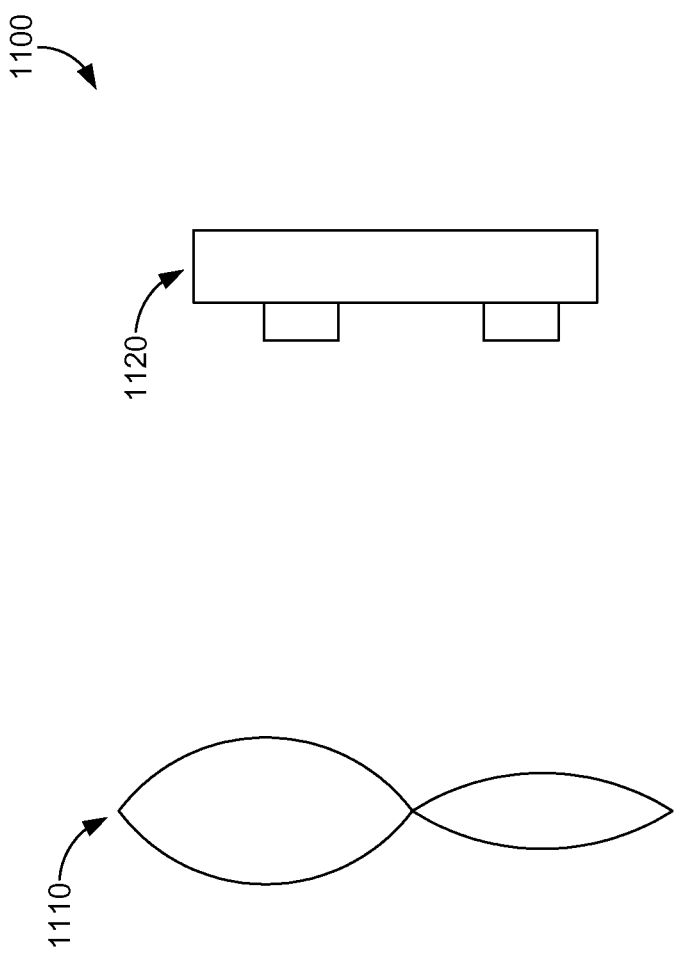
FIG. 11 is an optical diagram for an exemplary scanner with a sixth configuration in accordance with embodiments of the invention.

FIG. 11 is an optical diagram for an exemplary scanner 1100 with a sixth configuration in accordance with embodiments of the invention. The scanner 1100 includes a lens 1110 and sensor array 1120. In an effort to reduce the size of the scanner 1100 a multifocal lens may direct the light to the sensor array 1120. The lens 1110 has two focal lengths. A first portion of the lens 1110 has a first focal length. A second portion of the lens has a second focal length. The sensor array 1120 may consist of at least two rows of off-axis linear sensors arrays that correspond to the two portions of the lens 1110. The first portion of the lens 1110 corresponds to a first row of the at least two rows. The second portion of the lens 1110 corresponds to a second row of the at least two rows. In certain embodiments, each linear sensor array of the sensor array 1120 may be positioned at different heights on a substrate of the scanner 1100.

Figure 12:
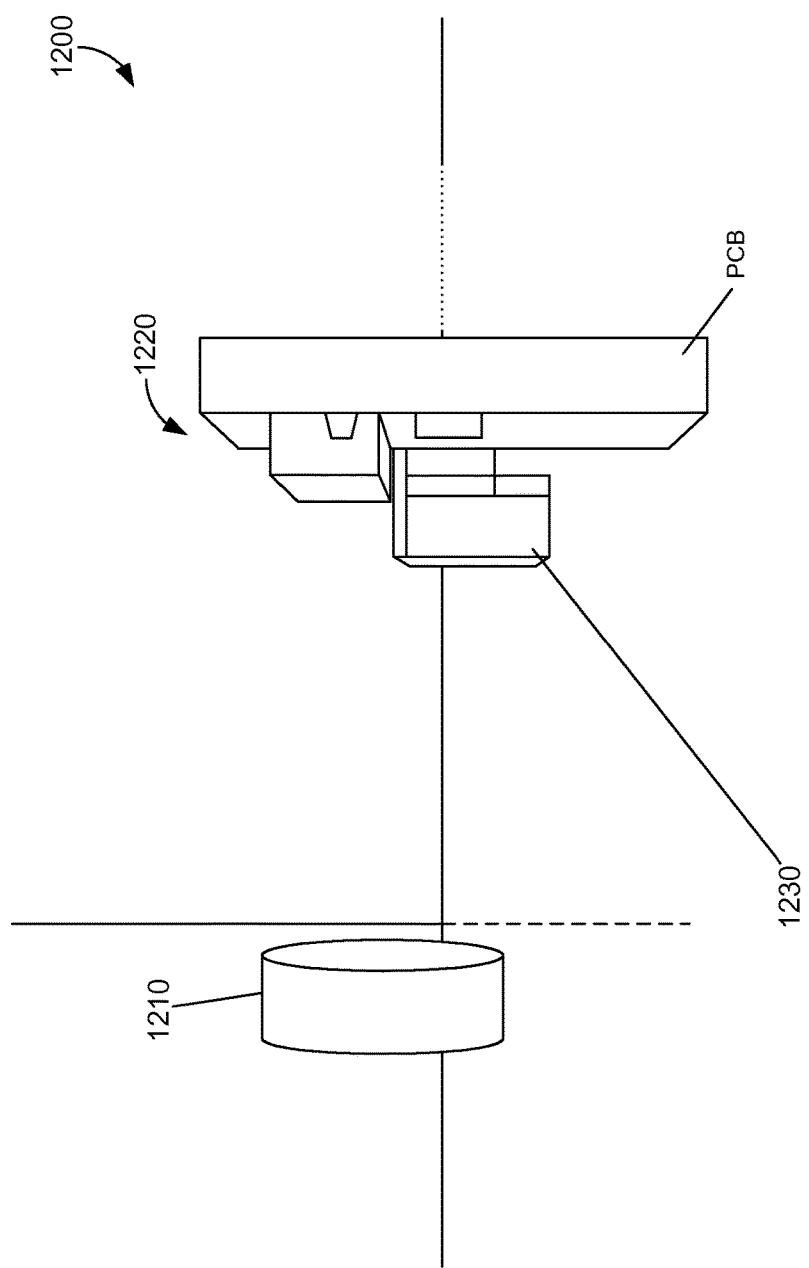
FIG. 12 is an optical diagram for an exemplary scanner with a seventh configuration in accordance with embodiments of the invention.

FIG. 12 is an optical diagram for an exemplary scanner 1200 with a seventh configuration in accordance with embodiments of the invention. The scanner 1200 includes a lens 1210 and sensor array 1220. In an effort to reduce the size of the scanner 1200, the sensor array 1220 may include two or more linear sensor arrays that are off axis. A prismatic transparent material 1230 with a predetermined refractive index may be positioned on at least one of the two or more linear sensor arrays. The prismatic transparent material 1230 may change the focalization of the light received by the at least one of the two or more linear sensor arrays.

Figure 13:
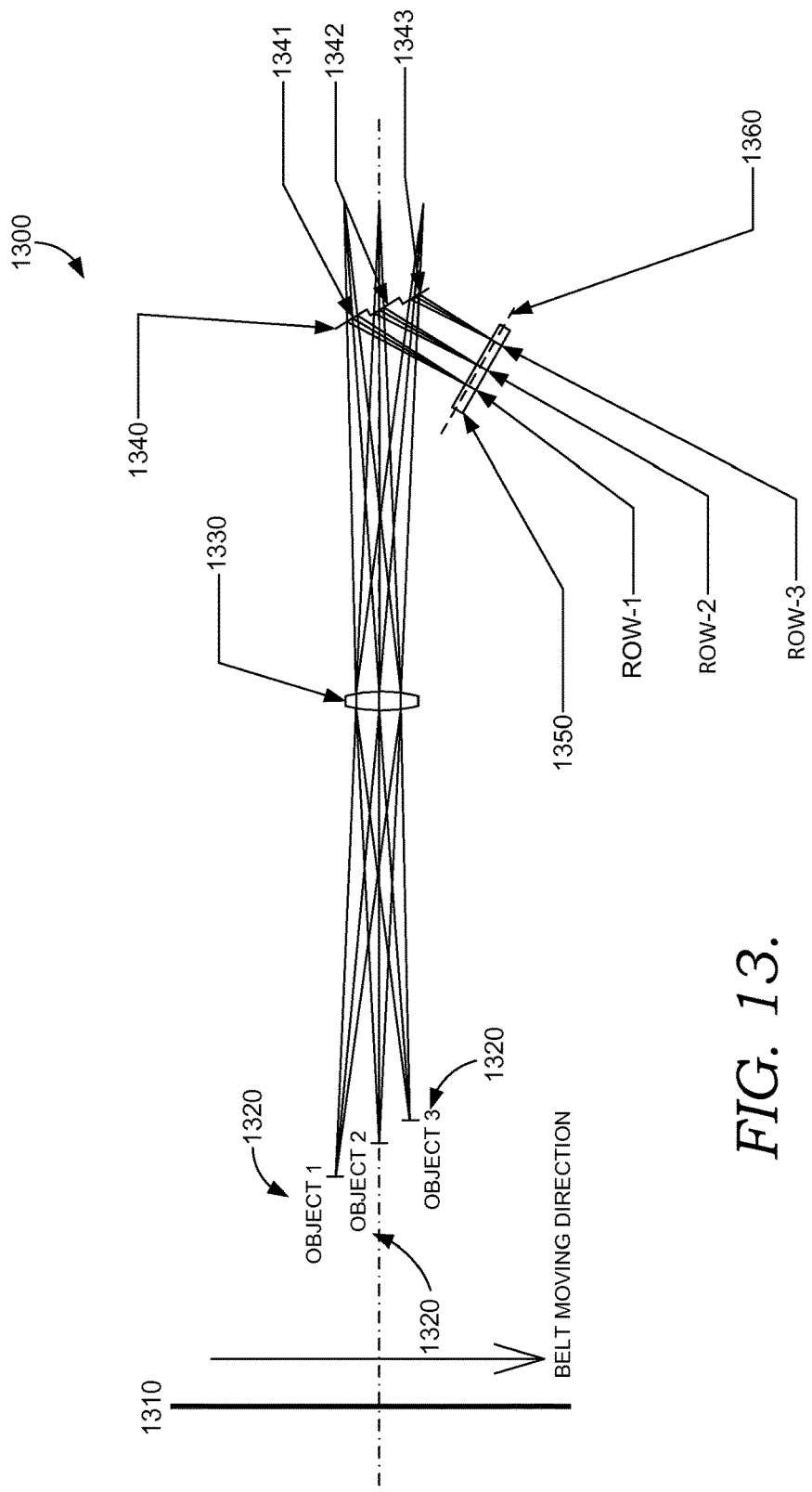
FIG. 13 is an optical diagram for an exemplary scanner with an eighth configuration in accordance with embodiments of the invention.

FIG. 13 is an optical diagram for an exemplary scanner 1300 with an eighth configuration in accordance with embodiments of the invention. The scanner 1300 processes objects 1320 that are transported on conveyor belt 1310. The scanner 1300 includes a lens 1330, an optical plate 1340, a sensor array 1350, and object images 1360.

The scanner 1300 may obtain object properties from several objects 1320 on the belt 1310. In one embodiment, the scanner 1300 obtains properties from three objects. Each of the objects 1320 may be processed by a different row of the sensor array 1350. In some embodiments, each of the rows produces different object properties.

The optical plate 1340 may have one or more mirrors. Each mirror may have a different angle. In one embodiment, each row of the sensor array 1350 may correspond to a mirror of optical plate 1340 with an angle that is different from other mirrors 1340 of the optical plate 1340 for adjacent rows in the sensor array 1350.

For instance, the optical plate 1340 may have three mirrors (1341-1343). The first mirror 1341 (e.g., small angle from the normal of the optical plate 1340) may be for the closest object 1320 to the lens 1330. The second angle for the second mirror 1342 (e.g., medium angle from the normal of the optical plate 1340) is larger than the first angle. This portion of the optical plate 1340 may be for the second closest object 1320 to the lens 1330. The third angle of the third mirror 1343 (e.g., large angle from the normal of the optical plate 1340) is larger than the first and second focal angles. This portion of the optical plate 1340 may be for the third closest object 1320 to the lens 1330. Each row of the sensor array 1350 may process different object properties from the captured object images 1360, in certain embodiments of the invention.

With the above configuration, a compact scanner is provided that processes objects on a conveyor belt. The compact scanner generates objects properties that may be used to read labels or barcodes on the top or sides of the object. A computer processor of the scanner may execute a computer-implemented method for processing the objects.

Figure 14:
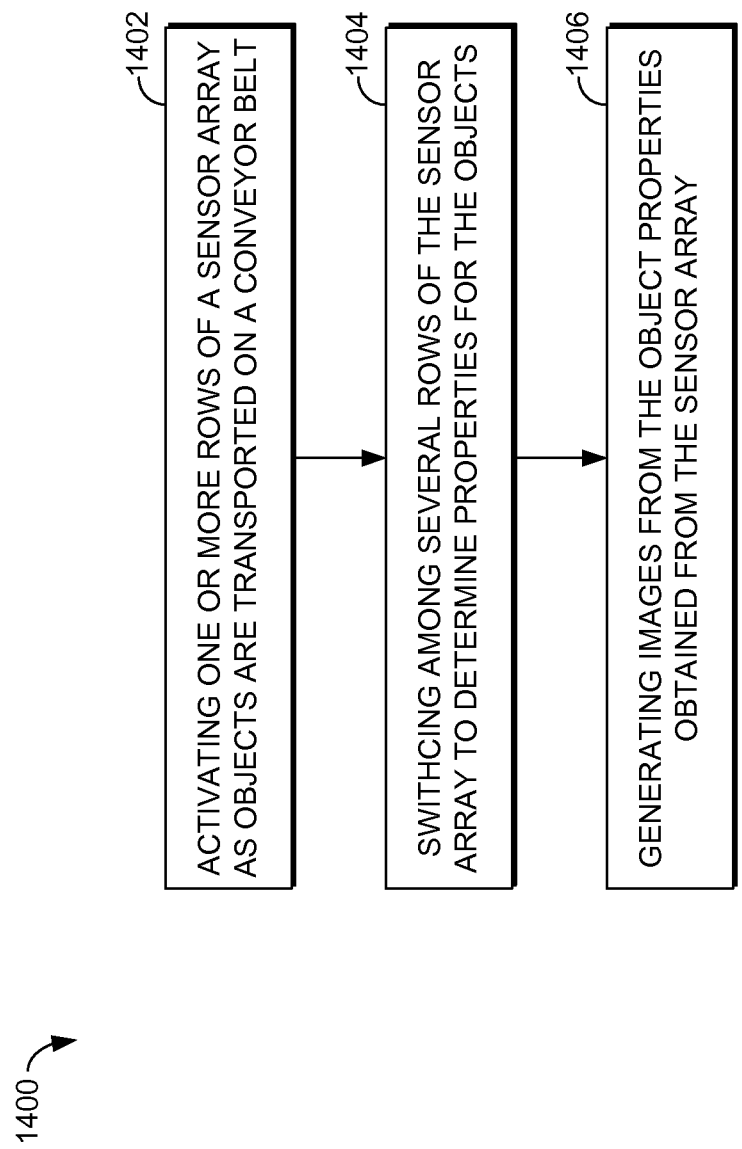
FIG. 14 is a block diagram showing a method for processing objects in accordance with embodiments of the invention.

FIG. 14 is a block diagram showing a method 1400 for processing objects in accordance with embodiments of the invention. The method 1400 is initialized when the conveyor belt system is powered on. In step 1402, one or more rows of a sensor array or an area array sensor are activated as the objects are transported within a field of view of the sensor array by the conveyor belt system. In some embodiments, the sensor array is tilted toward or away from a common lens. At least one sensor in the sensor array may be an object size sensor.

Optionally, an optical plate is positioned between the sensor array and the common lens. In a first embodiment, the optical plate may have a variable thickness such that different thicknesses correspond to different focus distances. In a second embodiment, the optical plate has a variable refractive index such that every refractive index corresponds to different focus distances and the optical plate has a uniform thickness. In a third embodiment, the optical plate has a variable refractive index such that every refractive index corresponds to different focus distances and the optical plate has a non-uniform thickness. In a fourth embodiment, the optical plate is an array of mirrors that are angled between the sensor array and the common lens such that an optical path between the common lens and sensor array changes. In a fifth embodiment, the optical plate is an array of variable lenses that focus at different distances.

In turn, at step 1404, the computer processor switches among several rows of the sensor array to determine properties for the objects on the conveyor belt. At step 1406, upon identifying the object properties, the computer processor generates images from the object properties obtained from the sensor array. The computer processor may capture light reflected by the objects and the conveyor belt to generate the object properties.

In some embodiments, a scanner may process light reflected from objects having shapes that vary significantly. For instance, a tunnel scanner with automatic scanning in a retail or industrial environment may process (e.g., check-out or deliver) objects placed at random orientations on a conveyor belt. The conveyor belt may include ridges or other friction creating parts to maintain reduce object movement (spin, vibration, or rotation) relative to the movement of the conveyor belt. The conveyor belt, in one embodiment, may move objects very quickly (e.g., 400 mm\s) to increase system throughput. Accordingly, the conveyor belt may include surface treatment that minimizes the motion of objects on the belt.

Figure 15:
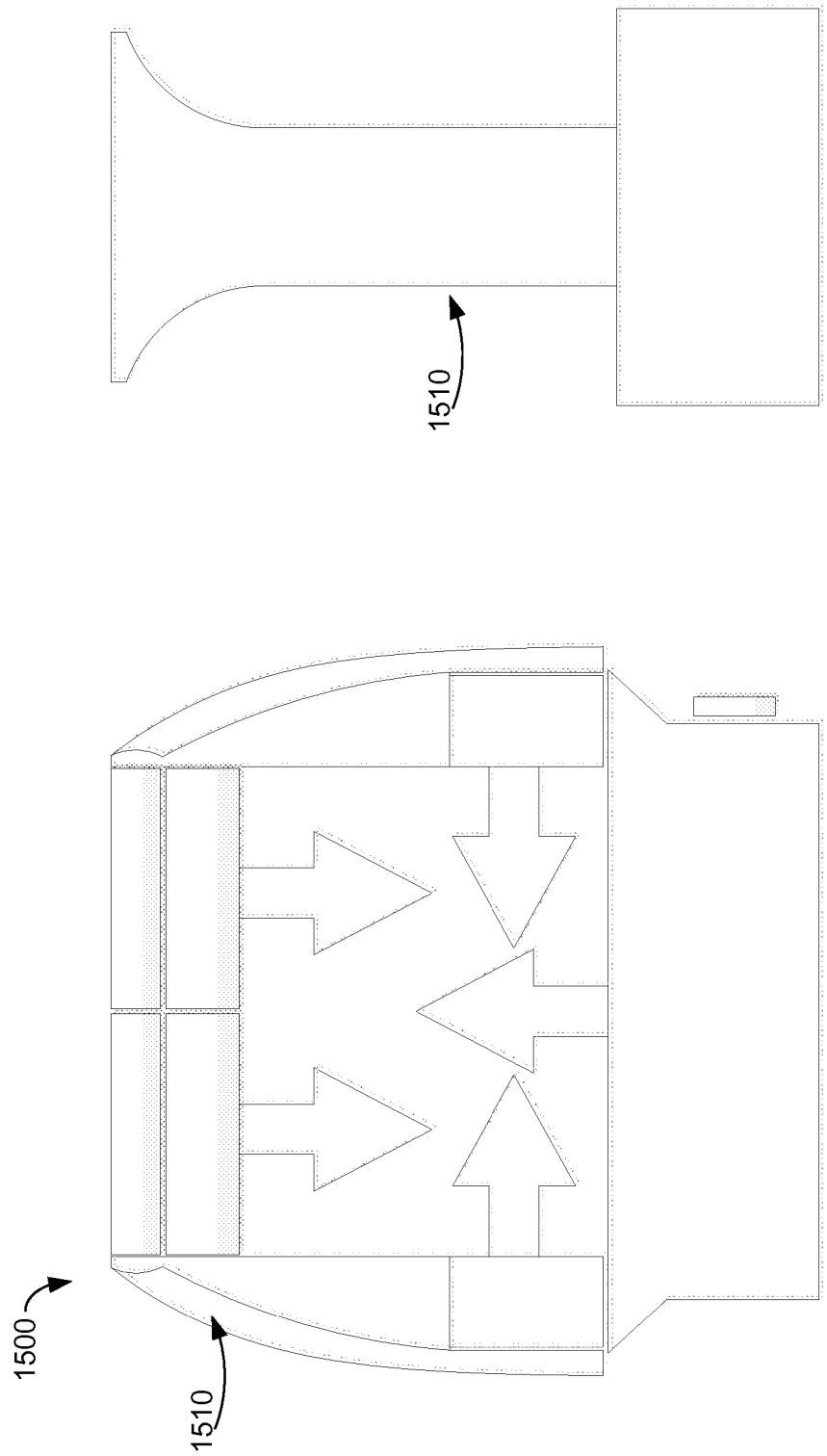
FIG. 15 is a perspective diagram showing a front and side view for of a tunnel scanner in accordance with embodiments of the invention.

FIG. 15 is a perspective diagram 1500 showing a front and side view for of a tunnel scanner 1510 in accordance with embodiments of the invention. The tunnel scanner 1510 includes at least 5 cameras positioned along the internal circumference of the pathway in and out of the tunnel scanner 1510. The cameras are positioned to capture top, left-side, right-side, and bottom-side images of the object as it passes along the pathway of the tunnel scanner 1510. Two cameras may be positioned at the top of the tunnel scanner 1510. One camera may be positioned on the right-side of the tunnel scanner 1510. One camera may be positioned on the left-side of the tunnel scanner 1510. One camera may be positioned below a surface of the conveyor belt that moves through the tunnel scanner 1510.

In some embodiments, the camera may include several electronic rolling shutter (ERS) area sensors. These ERS area sensors are high speed sensors that produce high definition images of the object as it moves through the pathway of the tunnel scanner 1510 on the conveyor belt. For instance, the ERS area sensors may include any of the following: MT9P031 (2592×1944 pixels×15 fps) by Aptina™ or AL30205M (1920×1080 pixels×6O fps) and A45904T (2048×1164 pixels at 222 Mpixel/sec) by Altasens™. Accordingly, the cameras of the tunnel scanner 1510 may consist of several ERS area sensors configured in a linear array that reads several segments of the object as it moves through the tunnel scanner 1510.

The tunnel scanner 1510 may include a combined entry and exit arch, in at least one embodiment. The combined entry and exit arch does not include a void at the top of the tunnel scanner. In alternative embodiments, the tunnel scanner 1510 includes an entry arch that is separate from the exit arch. The tunnel scanner 1510 may provide a space at the top of tunnel scanner 1510. The void may be positioned between the entry arch and exit arch at the top of the tunnel scanner 1510. The void may allow object illumination as it moves between the entry arch and exit arch of the tunnel scanner 1510.

Figure 16:
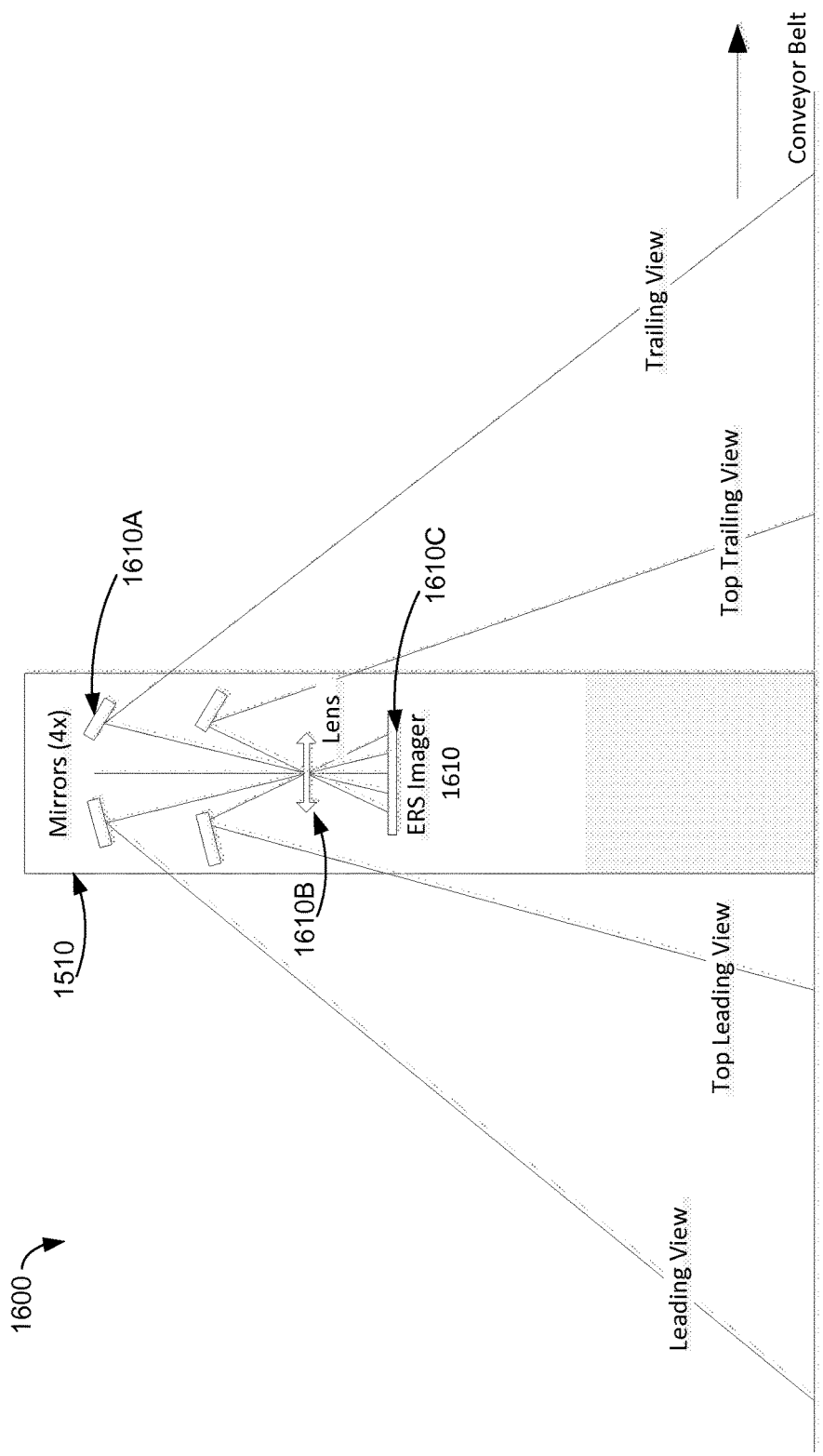
FIG. 16 is an optical diagram showing optical paths for light processed by the camera in accordance with embodiments of the invention.

FIG. 16 is an optical diagram 1600 showing optical paths for light processed by the cameras in accordance with embodiments of the invention. In one embodiment, a camera in the tunnel scanner 1510 may include an optical set 1610 that includes mirrors 1610A, lenses 1610B, and ERS sensors 1610C. The camera may be configured with varying depth of fields. The camera may have four mirrors 1610A, one and several ERS sensors 1610C. For instance, an upper position of the camera may include two of the mirrors 1610A in a position (e.g., a row having parallel mirrors) that is furthest away from the conveyor belt. A lower position of the camera may include two of the mirrors 1610A in a position (e.g., a second row having parallel mirrors) that is closer to the conveyor belt. The mirrors 1610A in the upper position of the camera may generate a scan line for a leading view and trailing view of the object on the conveyor belt. The upper position, in one embodiment, may correspond to far field of view. The mirrors 1610A in a lower position of the camera may generate a scan line for a top leading view and a top trailing view of the object on the conveyor belt. The lower position, in one embodiment, may correspond to the near field of view. The mirrors 1610A reflect light to a lens 1610B, which directs the light to the array of ERS sensors 1610C.

In one embodiment, the ERS sensors 1610C may include 4 stripes (two for top views and two for side views). Each of the 4 stripes may frame a different field of view of the object. The ERS sensors 1610C may obtain 4 different views of objects: two views as the object approaches the tunnel scanner 1510 and two views as the object leaves the tunnel scanner 1510. The tunnel scanner 1510 may select the stripes that provide pixels for the image of the object. In some embodiments, the stripes are selected based on the LED or laser source that generates the light reflected off the objet to the mirrors 1610A and directed to the ERS sensor 1610C arrays by the lens 1610B. Each stripe does not provide a complete image of the object. Instead, as the object moves along the conveyor belt the complete picture is captured by the ERS sensors 1610C on the stripes of the array.

The tunnel scanner 1510 may sequentially select rows having mirrors that provide pixel data to the array of ERS sensors. In turn, the pixel data from the sensor array may be used by the tunnel scanner 1510 to dynamically build images of the object line by line. The different rows of mirrors 1610A in the optical system may detect different views of the object as explained above.

Figure 17:
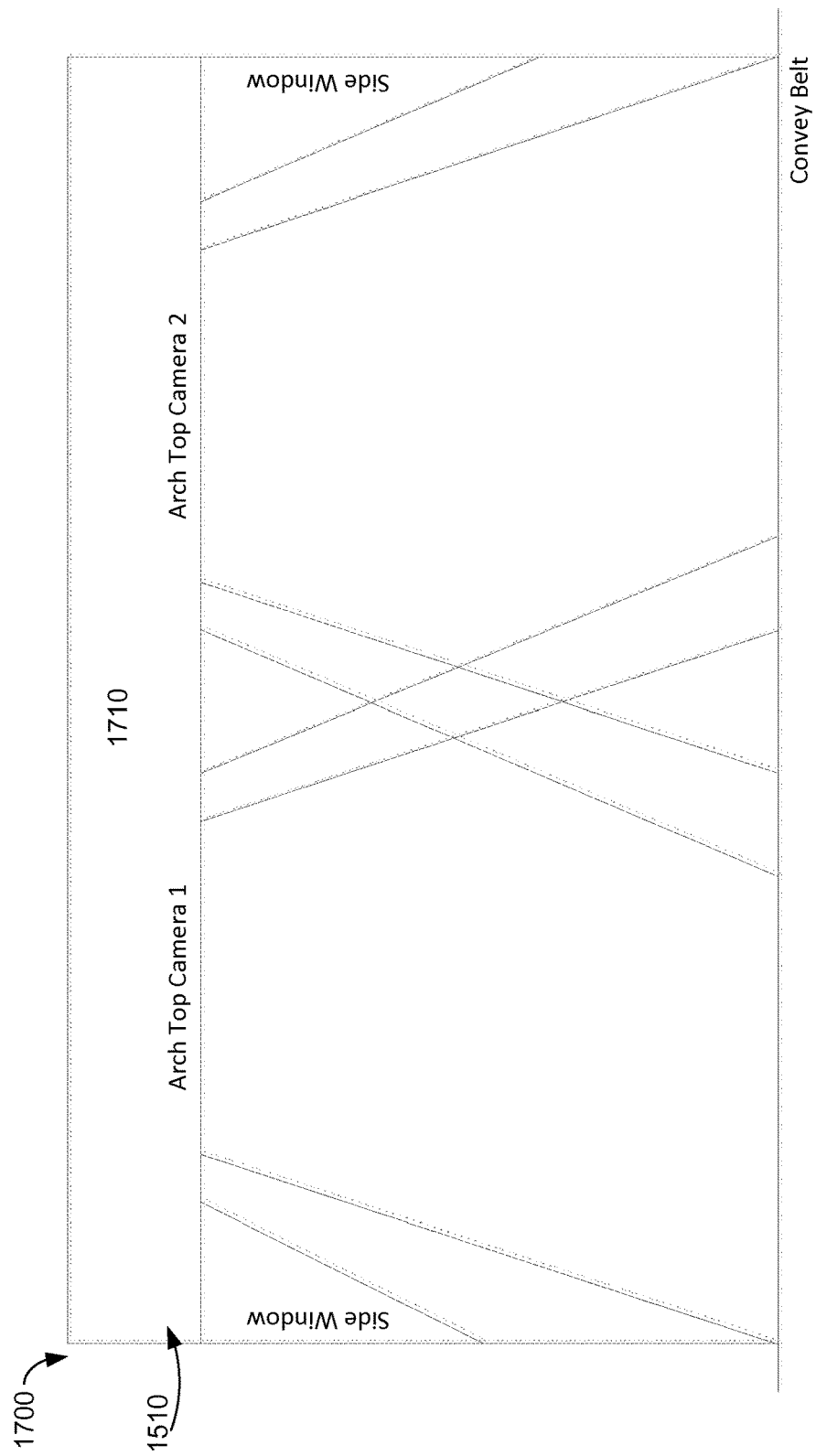
FIG. 17 is an optical diagram showing scan line overlap in accordance with embodiments of the invention.

FIG. 17 is an optical diagram 1700 showing scan line overlap in accordance with embodiments of the invention. In some embodiments, the tunnel scanner 1510 may include two cameras in an arch 1710 of the tunnel. The camera in the arch 1710 may generate overlapping scan lines. For instance, a first camera may generate a trailing scan line and top trailing scan line that overlap with a second camera generating a leading scan line and top leading scan line. In some embodiment, the scan overlap may produce redundant image data that is matched by the tunnel scanner 1510 to complete a barcode or other character if necessary.

Figure 18:
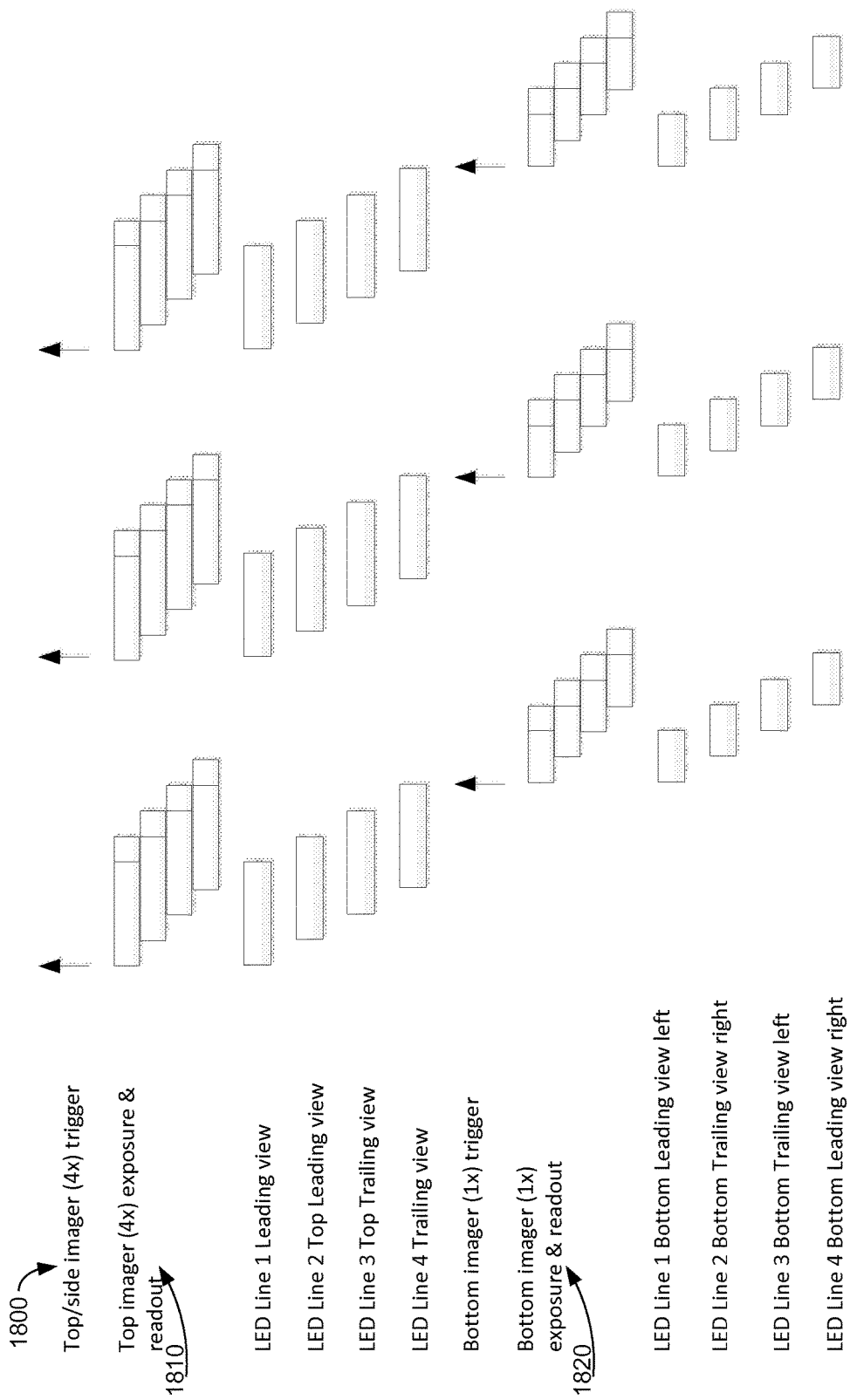
FIG. 18 is a exposure diagram processing objects having labels in accordance with embodiments of the invention.

FIG. 18 is an exposure diagram 1800 processing objects having labels in accordance with embodiments of the invention. The arch cameras may set an exposure to 100 microseconds. On the other hand, the bottom cameras below the conveyor belt may set an exposure to 40 microseconds. As the top sensory array 1810 and bottom sensory array 1820 in response to selected LED lines, an appropriate number of pixels are sampled to produce an image for the object on the conveyor belt. For instance, LED line 1 may reference an ERS sensor array that provide pixel data for a leading view, LED line 2 may reference an ERS sensor array that provide pixel data for a top leading view, LED line 3 may reference an ERS sensor array that provide pixel data for a top trailing view, and LED line 4 may reference an ERS sensor array that provide pixel data for a trailing view.

The bottom camera may operate in a similar fashion. The pixel data made available may correspond to the LED line selected by the tunnel scanner 1510. For instance, LED line 1 may reference an ERS sensor array that provide pixel data for a bottom leading view left, LED line 2 may reference an ERS sensor array that provide pixel data for a bottom trailing view right, LED line 3 may reference an ERS sensor array that provide pixel data for a bottom trailing view left, and LED line 4 may reference an ERS sensor array that provide pixel data for a bottom leading view right.

Figure 19:
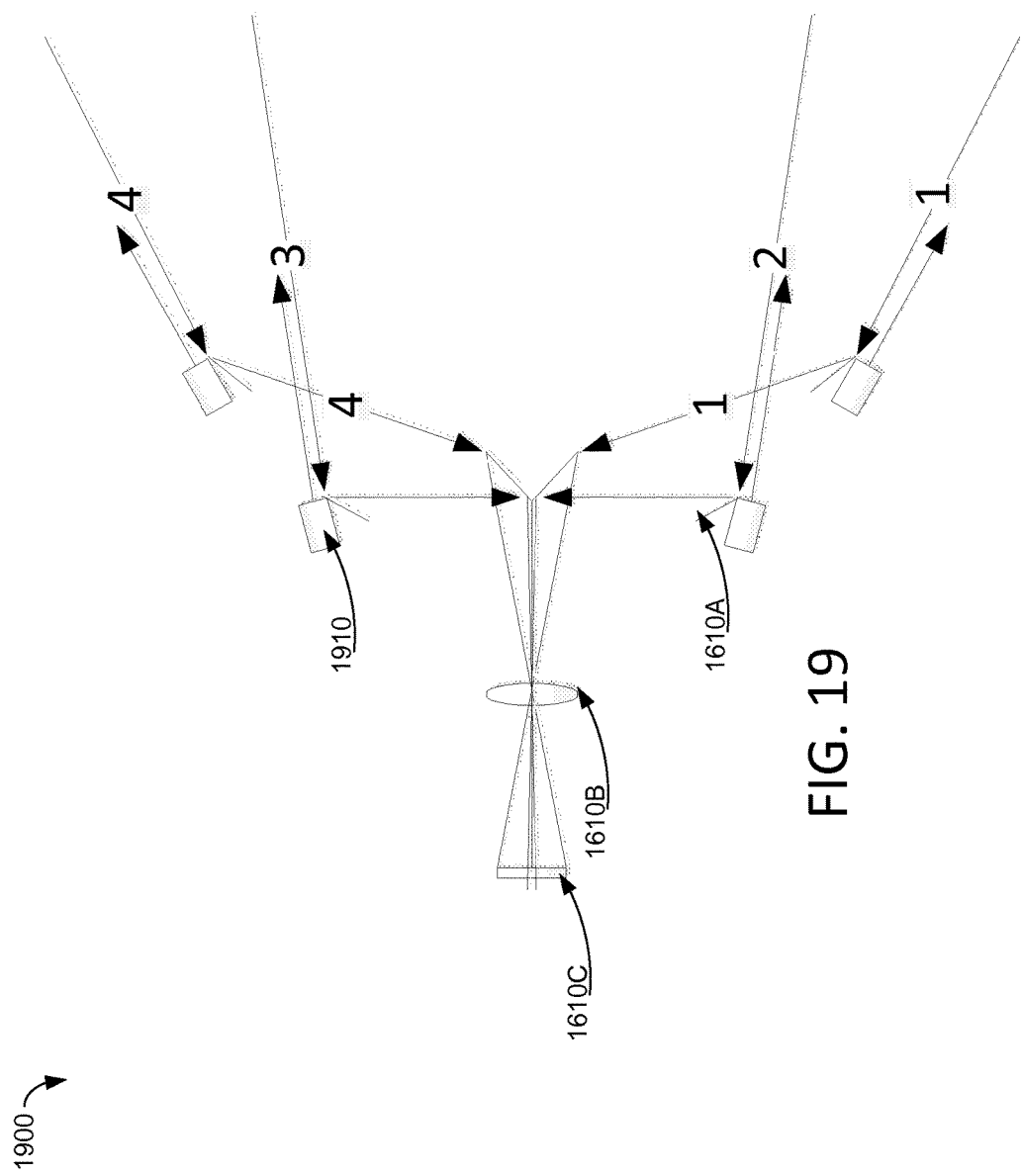
FIG. 19 is an optical diagram showing lens and mirrors for the tunnel scanner in accordance with embodiments of the invention.

FIG. 19 is an optical diagram showing lens and mirrors for the tunnel scanner in accordance with embodiments of the invention. As explained above the LEDs that generated the light that is reflected from the object may be collimated LEDs 1910. Each LED 1910 may have a mirror 1920 that is positioned in close proximity to the LEDs 1910. The mirrors 1610A directs the reflected light to a lens 1610B for focusing by before being processed by the ERS sensor array 1610C. The mirrors 1610A allow the light to be directed to the appropriate stripe of the ERS sensor array 1610C. In one embodiment, during calibration, the tunnel scanner 1510 configures the relationship between the stripes in the ERS sensor array 1610C and the LED lines that illuminate the object on the conveyor belt. The optical configuration of 1900 may, in certain embodiments, be directed to cameras located in the walls (side segments) of the tunnel scanner 1510.

Accordingly, embodiments to invention process items bay reducing or stabilizing object motion relative to belt (e.g., object speed variation relative to camera) causes image distortion for line scan based systems that may affect label decoding. For instance, cylindrical objects such as cans, water, or wine bottles have higher probability of moving relative to the belt due to the object acceleration. The belt may be configures with friction items: adhesive, gloves, groves, etc. to reduce object movement.

The embodiments of the invention provide a multi-perspective processing of an object as the tunnel scanner reads the labels. The tunnel scanner provides ERS sensors in a multi-stripe configuration having ERS sensor clusters. A LED arrangement may improve object illumination efficiency as the object moves through the tunnel scanner on the conveyor belt.

As the object moves along the conveyor belt, the tunnel scanner may selectively initiate LEDs corresponding to each of the views that are produced by the tunnel scanner. The leading view, trailing view, top trailing view, and top leading view are each generated in response to a timely illumination of the object on the conveyor belt.

The tunnel scanner may read labels that are 7.5 mil (1 inch/1000) or smaller at high frequency. Given the size of the label, a conveyor belt width of 18 inches, and 1.5 pixel/x value, an approximate number of pixels required across the conveyor belt would be 1800/7.5*1.5=3600. In some embodiments, two views of 2592 (e.g. ERS sensor Aptina 5MP) is acceptable. At belt speeds of 400 mm/sec, 1 square pixel requires 1/(7.5*25.4/400/1.5)=3149 Hz line rate. In one embodiment, the system image pixel data rate=4 (lines/cam)×2592 (pixels/line)×5 (cameras)×3149 lines/sec=163,275,591 pixels/sec. A lower data rate may require fewer processors compared with full frame scanning.

With the a line by line processing of the object, decoding the bar code or other identifier may be more efficient as compared to processing a full image of the object. Accordingly, a tunnel scanner for imaging based automatic barcode scanning systems provides retail market or industrial application. High speed linear image ERS sensor based systems or global shutter area imager based systems may be deployed due to the relatively high speed requirement of conveyor belt. In some embodiments, the conveyor belt includes special surface treatment to minimize the relative motion between the objects and conveyor belt. The treatment may include textured gloves, flexible materials similar to carpet surface, or a sticky surface.

In some embodiments, the computer processor discards object properties that are associated with images that are out of focus or below a specified resolution threshold. The object properties from several of the rows of the sensor array are associated with images that may be in focus. The object properties include pixels.

Accordingly, embodiments of the invention provide a compact scanner that may be used to process object in a non-singulated flow on a conveyor belt. The scanner may capture object properties for two or more objects at the same time. The scanner device comprises a substrate and a plurality of sensors attached to the substrate. The plurality of sensors forms an array of sensors having at least two or more rows of off-axis sensors. The plurality of sensors includes linear sensors, line scan sensors, area array sensors, 2D sensors, CCD sensors, or CMOS sensors. The array of sensors includes adjacent rows of sensors having different orientations. The array of sensors includes adjacent rows of sensors having different distances from a shared optical lens for the scanner device.

In one embodiment, the substrate may have a stair-shaped cross-section or an L-shaped cross-section. The substrate is plastic or ceramic, in some embodiments. The substrate may be tilted toward or away from the shared optical lens of the scanner. The substrate may be a printed circuit board.

Accordingly, a conveyor belt system for processing objects is provided. The conveyor belt system comprises at least one processor. The processor activates one or more rows of a sensor array as the objects are transported within a field of view of the sensor array by the conveyor belt system. The sensor array has a shared lens system in the conveyor belt system. In turn, the computer processor may switch among several rows of the sensor array to determine properties for the objects on the conveyor belt. In turn, images are generated by the computer processor for the object properties obtained from the sensor array.

The conveyor system may include computer-readable media. The media includes any available media that can be accessed by the sensor array or area array sensor to store object properties. The computer-readable media includes both volatile and nonvolatile media, and removable and non-removable media. By way of example, and not limitation, computer-readable media may comprise computer storage media and communication media. Computer storage media includes volatile and nonvolatile, removable and nonremovable media implemented in any method or technology for storage of information such as computer-readable instructions, data structures, program modules, or other data. Computer storage media include, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium, which can be used to store the desired information and which can be accessed by the conveyor system.

Communication media may include any information delivery media, typically embodied in computer-readable instructions, data structures, program modules, and/or may include other data in a modulated data signal such as a carrier wave or other transport mechanism. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, Wi-Fi, WiMAX, GSM, and other wireless media. Combinations of any of the above also may be included within the scope of computer-readable media.

When operated in a networked environment, the conveyor system may connect to one or more remote devices. The remote devices may include a personal computer, a server, a router, a network PC, a cell phone, a peer device, or other common network node, and typically includes many or all of the elements described above relative to the conveyor system.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., and refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network.

The computing device includes a bus that directly or indirectly couples the following devices: memory, one or more processors, one or more presentation components, input/output ports, input/output components, and an illustrative power supply. The bus represents what may be one or more busses (such as an address bus, data bus, or combination thereof).

The computing device includes one or more processors that read data from various entities such as memory or I/O components. Presentation component(s) present data indications to a user or other device. Exemplary presentation components include a display device, speaker, printing component, vibrating component, etc. The I/O ports allow the computing device to be logically coupled to other devices including the I/O components, some of which may be built in. Illustrative components include a microphone, joystick, game pad, satellite dish, scanner, printer, wireless device, etc.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, handheld or laptop devices, multiprocessor systems, microcontroller-based systems, set-top boxes, programmable consumer electronics, network PCs, minicomputers, mainframe computers, distributed computing environments that include any of the above systems or devices, and the like.

In some embodiments, the conveyor system has a processor that executes a computer-implemented method for processing objects. The processor activates one or more rows of an area array sensor as the objects are transported within a field of view of the area array sensor by the conveyor belt system. The area array sensor has a shared lens system. The area array sensor has several rows and random programmable region of interest (ROI) readout. In turn, the processor sends instructions to the random programmable ROI readout to switch among several rows of the area array sensor to determine properties for the objects on the conveyor belt. The computer processor generates images from the object properties obtained from the area array sensor.

When generating images from object properties, the computer processor may discard object properties that are associated with images that are out of focus or below a specified resolution threshold. The object properties from several of the rows of the area array sensor are associated with images that are in focus. In one embodiment, object properties from several of the rows of the area array sensor are associated with images of object labels that are in focus. In other embodiments, the object properties include pixels.

To produce the object properties, the area array sensor processes light that traverse the shared lens system. The light may refract to the area array sensor from an optical plate that may configured in several way. In one configuration, an optical plate is positioned between the sensor arrays and the common lens. The optical plate has a variable thickness such that different thicknesses correspond to different focus distances. In another configuration, the optical plate has a variable refractive index such that every refractive index corresponds to different focus distances and the optical plate has uniform thickness or non-uniform thickness. In a further configuration, the optical plate is an array of mirrors that is angled between the area array sensor and the common lens such that the optical path between the common lens and area array sensor changes. In yet another configuration, the optical plate is an array of variable lenses that focus at different distances, wherein the optical plate is positioned between the area array sensor and the common lens. In some embodiment, the optical plate is omitted and the area array sensor is tilted toward or away from the common lens. At least one sensor in the area array sensor may be an object size sensor.

While the embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the embodiments of the invention.

The embodiments of the invention have been described in relation to a particular exemplary conveyor system and scanner, which are intended in all respects to be illustrative rather than restrictive. Alternative embodiments will become apparent to those of ordinary skill in the art to which the invention pertains without departing from its scope.

What is claimed is:

1. A computer-implemented method executed by a conveyor belt system for processing objects, the method comprising:
    activating one or more of a plurality of rows of sensors of a sensor array as the objects are transported within a field of view of the sensor array by the conveyor belt system, wherein each of the plurality of rows of sensors shares a common lens, and wherein a separation between two of the plurality of rows of sensors multiplied by a distance of a first object being transported from the common lens and divided by an effective focal length of the common lens equates to a minimum gap between the first object and a second object that can be processed by the conveyor belt system;
    switching activation among at least a portion of the plurality of rows of the sensor array to determine properties for the objects on the conveyor belt; and
    generating images from the object properties determined from the sensor array.

2. The computer-implemented method of claim 1, wherein generating images from object properties determined from the sensor array further comprises:
    discarding object properties that are associated with images that are out of focus or below a specified resolution threshold.

3. The computer-implemented method of claim 1, wherein activating one or more of the plurality of rows of the sensor array comprises activating multiple rows of the plurality of rows of the sensor array, and wherein object properties from two or more activated rows of the sensor array are associated with images that are in focus.

4. The computer-implemented method of claim 1, wherein activating one or more of the plurality of rows of the sensor array comprises activating multiple rows of the plurality of rows of the sensor array, and wherein object properties from two or more activated rows of the sensor array are associated with images of object labels that are in focus.

5. The computer-implemented method of claim 1, wherein the object properties include pixels.

6. The computer-implemented method of claim 1, wherein light is processed by the sensor array to generate the object properties.

7. The computer-implemented method of claim 1, wherein at least one of the plurality of rows of sensors of the sensor array is off-axis with respect to a center line of the sensor array.

8. The computer-implemented method of claim 7, wherein an optical plate is positioned between the sensor array and the common lens.

9. The computer-implemented method of claim 8, wherein the optical plate has a variable thickness such that different thicknesses correspond to different focus distances.

10. The computer-implemented method of claim 8, wherein the optical plate has a variable refractive index such that every refractive index corresponds to different focus distances and the optical plate has uniform thickness or non-uniform thickness.

11. The computer-implemented method of claim 8, wherein the sensor array is tilted toward or away from the common lens.

12. The computer-implemented method of claim 8, wherein the optical plate is an array of mirrors that are angled between the sensor array and the common lens such that the optical path between the common lens and the sensor array changes.

13. The computer-implemented method of claim 8, wherein the optical plate is an array of variable lenses that focus at different distances, and wherein the optical plate is positioned between the sensor array and the common lens.

14. The computer-implemented method of claim 8, wherein at least one sensor in the sensor array is an object size sensor.

15. The computer-implemented method of claim 1, wherein each of the one or more of the plurality of rows of the sensor array can be selected for activation.

16. A conveyor belt system for processing objects, the system comprising:
    at least one processor configured to:
    activate one or more of a plurality of rows of sensors of a sensor array as the objects are transported within a field of view of the sensor array by the conveyor belt system, wherein each of the plurality of rows of sensors shares a common lens, and wherein a separation between two of the plurality of rows of sensors multiplied by a distance of a first object being transported from the common lens and divided by an effective focal length of the common lens equates to a minimum gap between the first object and a second object that can be processed by the conveyor belt system;

switch activation among at least a portion of the plurality of rows of the sensor array to determine properties for the objects on the conveyor belt; and generate images from the object properties determined from the sensor array.

17. The conveyor belt system of claim 16, wherein each of the one or more of the plurality of rows of the sensor array can be selected for activation.

18. A computer-implemented method executed by a conveyor belt system for processing objects, the method comprising:

activating one or more of a plurality of rows of sensors of an area array sensor as the objects are transported within a field of view of the area array sensor by the conveyor belt system, wherein each of the plurality of rows sensors shares a common lens, and wherein a separation between two of the plurality of rows of sensors multiplied by a distance of a first object being transported from the common lens and divided by an effective focal length of the common lens equates to a minimum gap between the first object and a second object that can be processed by the conveyor belt system;

switching activation among at least a portion of the plurality of rows of the area array sensor to determine properties for the objects on the conveyor belt; and generating images from the object properties determined from the area array sensor.

19. The computer-implemented method of claim 18, wherein each of the one or more of the plurality of rows of the area array sensor can be selected for activation.

* * * * *